United States Patent
Liu

(10) Patent No.: US 12,355,902 B2
(45) Date of Patent: Jul. 8, 2025

(54) BLOCKCHAIN-BASED DATA PROCESSING METHOD, APPARATUS, DEVICE, AND READABLE STORAGE MEDIUM

(71) Applicant: Tencent Technology (Shenzhen) Company Limited, Shenzhen (CN)

(72) Inventor: Pan Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 488 days.

(21) Appl. No.: 17/741,131

(22) Filed: May 10, 2022

(65) Prior Publication Data
US 2022/0271960 A1 Aug. 25, 2022

Related U.S. Application Data

(63) Continuation of application No. PCT/CN2021/088633, filed on Apr. 21, 2021.

(30) Foreign Application Priority Data

May 20, 2020 (CN) .......................... 202010430099.4

(51) Int. Cl.
*H04L 9/00* (2022.01)
*H04L 9/32* (2006.01)

(52) U.S. Cl.
CPC .............. *H04L 9/50* (2022.05); *H04L 9/3236* (2013.01)

(58) Field of Classification Search
CPC .............................. H04L 9/3236; H04L 9/3297
See application file for complete search history.

(56) References Cited

U.S. PATENT DOCUMENTS 8,229,961 B2 * 7/2012 Whitehouse ........ G06F 16/1774
707/791
10,602,409 B1 * 3/2020 Oroskar ................ H04W 28/18
(Continued)

FOREIGN PATENT DOCUMENTS

CN 103731423 A 4/2014
CN 109064291 A 12/2018
(Continued)

OTHER PUBLICATIONS

International Search Report and Written Opinion received for Application No. PCT/CN2021/088633 mailed Jul. 21, 2021 (English and Chinese languages) (11 pages).

*Primary Examiner* — Samson B Lemma
(74) *Attorney, Agent, or Firm* — Banner & Witcoff, Ltd.

(57) ABSTRACT

A blockchain-based data processing method, apparatus, device, and readable storage medium may avoid repeated transmission or storage of the transaction data, which avoids a waste of storage resources. Target transaction data is obtained from a transaction pool, and a to-be-checked hash value of the target transaction data is generated. A block list of historical blocks that have been uploaded to a blockchain is obtained, and an upload status of the target transaction data is determined according to the block list and the to-be-checked hash value. Based on this determination, the target transaction data may be deleted when the upload status of the target transaction data is in an uploaded state, or a target block is generated and uploaded according to the target transaction data when the upload status of the target transaction data is in an un-uploaded state.

17 Claims, 12 Drawing Sheets

(56) References Cited

U.S. PATENT DOCUMENTS

| | | | |
|---|---|---|---|
| 10,867,299 B2* | 12/2020 | Cheng | G06Q 20/02 |
| 11,341,493 B2* | 5/2022 | Cheng | G06Q 20/389 |
| 2015/0058583 A1 | 2/2015 | Baldwin et al. | |
| 2019/0050831 A1* | 2/2019 | Kikinis | H04L 9/0637 |
| 2019/0088099 A1* | 3/2019 | Garg | G06F 3/165 |
| 2019/0251557 A1* | 8/2019 | Jin | H04L 9/0637 |
| 2020/0286082 A1* | 9/2020 | Cheng | G06Q 20/389 |
| 2020/0394648 A1* | 12/2020 | Blackshear | H04L 63/12 |
| 2021/0065169 A1* | 3/2021 | Cheng | G06Q 20/389 |
| 2022/0012233 A1* | 1/2022 | Thurau | H04L 63/0428 |
| 2022/0391893 A1* | 12/2022 | Brezo Fernández | G06Q 20/3255 |
| 2022/0391900 A1* | 12/2022 | Wuest | H04L 9/0897 |
| 2024/0184886 A1* | 6/2024 | Kutner | G06F 3/0647 |

FOREIGN PATENT DOCUMENTS

| | | | |
|---|---|---|---|
| CN | 109711839 A | | 5/2019 |
| CN | 110636009 A | * | 12/2019 |
| CN | 110738497 A | | 1/2020 |
| CN | 111130801 A | | 5/2020 |
| CN | 111600720 A | | 8/2020 |
| CN | 111932227 A | * | 11/2020 |
| WO | WO 2018/158936 A1 | | 9/2018 |

* cited by examiner

BLOCKCHAIN-BASED DATA PROCESSING METHOD, APPARATUS, DEVICE, AND READABLE STORAGE MEDIUM

RELATED APPLICATION

This application is a continuation of PCT Application No. PCT/CN2021/088633, filed Apr. 21, 2021, published as WO 2021/233049 A1, entitled "BLOCKCHAIN-BASED DATA PROCESSING METHOD, APPARATUS, DEVICE, AND READABLE STORAGE MEDIUM", which claims priority to Chinese Patent Application No. 202010430099.4 filed on May 20, 2020, each of which are incorporated herein by reference in their entirety.

FIELD OF THE TECHNOLOGY

This application relates to the field of blockchain technologies, and in particular, to a blockchain-based data processing method, apparatus, device, and readable storage medium.

BACKGROUND OF THE DISCLOSURE

When obtaining transaction data, a node in a blockchain network broadcasts the obtained transaction data to other nodes in the blockchain network, so as to maintain consistency between transaction data in transaction pools of the nodes. However, in the case of network congestion, there will be a delay in the process of broadcasting transaction data. For example, when a node A obtains transaction data S, the node A broadcasts the transaction data S to a node B, a node C, and a node D. The node B is the first to obtain the transaction data S, and the node C and the node D obtain the transaction data S later. That is, due to different delay times, each node obtains the transaction data S at different time points.

After obtaining the transaction data S, the node A may package the transaction data S to generate a block. After a consensus on the block is reached in the blockchain network, the block can be successfully uploaded to the blockchain. In this case, the node C may obtain the transaction data S after the block has been successfully uploaded to the blockchain, so the node C may package the transaction data S for consensus verification and upload the transaction data S to the blockchain. Consequently, the transaction data S is repeatedly packaged and uploaded to the blockchain, leading to repeated storage of the transaction data, and resulting in a waste of storage resources.

SUMMARY

An embodiment of this application provides a blockchain-based data processing method, executed by a computer device, the method including:
obtaining target transaction data from a transaction pool, and generating a to-be-checked hash value of the target transaction data;
obtaining a block list of historical blocks that have been uploaded to a blockchain, and determining an upload status of the target transaction data according to the block list and the to-be-checked hash value;
deleting the target transaction data when the upload status of the target transaction data is an uploaded state; and
generating a target block according to the target transaction data and performing uploading processing on the target block, when the upload status of the target transaction data is an un-uploaded state.

An embodiment of this application provides a blockchain-based data processing method, executed by a computer device, the method including:
obtaining a target block transmitted by a block generation node and a to-be-checked hash value of target transaction data in the target block;
obtaining a block list of historical blocks that have been uploaded to a blockchain, and determining an upload status of the target transaction data according to the block list and the to-be-checked hash value;
determining that the target block fails consensus verification, when the upload status of the target transaction data is an uploaded state; and
performing consensus processing on the target block, when the upload status of the target transaction data is an un-uploaded state.

An embodiment of this application provides a blockchain-based data processing apparatus, including:
a first obtaining module, configured to obtain target transaction data from a transaction pool, and generate a to-be-checked hash value of the target transaction data;
a second obtaining module, configured to obtain a block list of historical blocks that have been uploaded to a blockchain, and determine an upload status of the target transaction data according to the block list and the to-be-checked hash value;
a first deletion module, configured to delete the target transaction data when the upload status of the target transaction data is an uploaded state; and
a block generation module, configured to generate a target block according to the target transaction data and perform uploading processing on the target block, when the upload status of the target transaction data is an un-uploaded state.

An embodiment of this application provides a blockchain-based data processing apparatus, including:
a block obtaining module, configured to obtain a target block transmitted by a block generation node and a to-be-checked hash value of target transaction data in the target block;
a list obtaining module, configured to obtain a block list of historical blocks that have been uploaded to a blockchain, and determine an upload status of the target transaction data according to the block list and the to-be-checked hash value;
a failure determining module, configured to determine that the target block fails consensus verification, when the upload status of the target transaction data is an uploaded state;
and
a block consensus module, configured to perform consensus processing on the target block, when the upload status of the target transaction data is an un-uploaded state.

An embodiment of this application provides a computer device, including: a processor and a memory,
the memory being configured to store program instructions, and the processor being configured to call the program instructions to implement the blockchain-based data processing method provided in the embodiments of the present application.

An embodiment of this application provides a non-transitory computer-readable storage medium, storing a computer program, the computer program including program instructions, the program instructions, when executed by a processor, implementing the blockchain-based data processing method provided in the embodiments of the present application.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1:
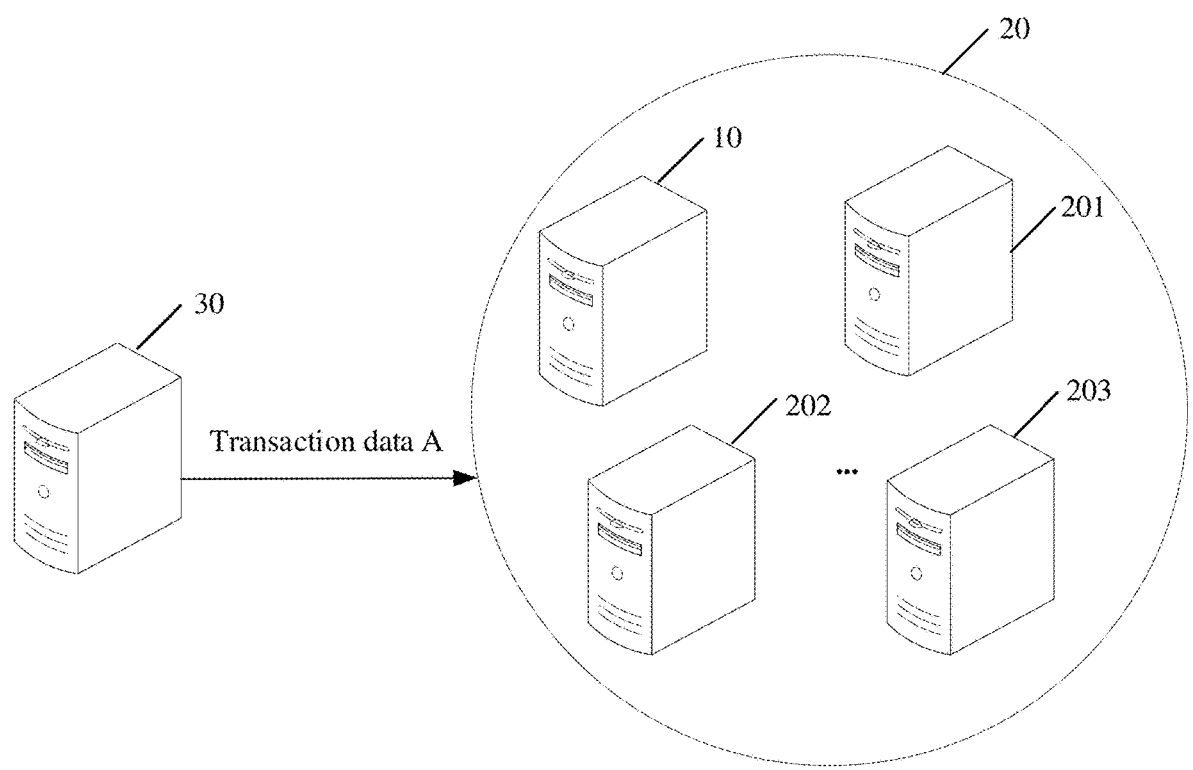
FIG. 1 is a schematic diagram of a system architecture according to an embodiment of this application.

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

In the following descriptions, the term "some embodiments" describes subsets of all possible embodiments, but it may be understood that "some embodiments" may be the same subset or different subsets of all the possible embodiments, and can be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, a description is made of various terms in the embodiments of this application.

1. Blockchain: In a narrow sense, the blockchain is a chain data structure with blocks as the basic unit. A digital digest is used in a block to verify the transaction history obtained before, which is suitable for the need of tamper resistance and scalability in distributed accounting scenarios. In a broad sense, the blockchain also refers to a distributed accounting technology implemented by a blockchain structure, including distributed consensus, privacy and security protection, peer-to-peer communication technology, network protocols, smart contracts, etc. The goal of the blockchain is to implement a distributed ledger of data records that only allows additions, not deletions. The underlying structure of the ledger is a linear linked list. The linked list is composed of "blocks" connected in series. A hash value of a predecessor block is recorded in a successor block. Whether each block (and transactions in the block) is valid can be quickly verified by calculating the hash value. If a node in a blockchain network proposes to add a new block, the block needs to be confirmed by consensus through a consensus mechanism.

2. Block: A block records all transaction data and status results that occur within a period of time, which is a consensus on the current ledger status. In some embodiments, for the blockchain, each time transaction data is written, that is, the above-mentioned transaction process, a block is created.

3. Blockchain network: It is a collection of a series of nodes that add new blocks into a blockchain through consensus.

4. Hash value: A hash value, or referred to as an information eigenvalue or eigenvalue, is obtained by converting input data of any length into a password through a hash algorithm and outputting the password in a fixed way. The original input data cannot be retrieved by decrypting the hash value. The hash algorithm is a one-way encryption function. In a blockchain, each block (except a genesis block) contains a hash value of a predecessor block, and the predecessor block is called a parent block of the current block. Hash value may be a core foundation of blockchain technology. It preserves the authenticity of the data recorded and viewed, as well as the integrity of the blockchain as a whole.

5. Consensus mechanism: The consensus mechanism is to complete the verification and confirmation of transaction data through the voting of special nodes (e.g., consensus nodes). The goal is to make all nodes in the blockchain network maintain a consistent blockchain. Algorithms for reaching distributed consensus are not limited in the embodiments of this application, and may be, for example, Proof of Work (POW), Proof of Stake (PoS), Practical Byzantine Fault Tolerance (PBFT), etc.
6. Transaction pool: It may include a local transaction pool of a node in a blockchain network, and is configured to store transaction data received by the node.
7. Block generation: It refers to the generation of blocks. A block generation node refers to a node configured to generate blocks in the blockchain network.

Referring to FIG. 1, which is a schematic architectural diagram of a blockchain-based data processing system according to an embodiment of this application. As shown in FIG. 1, a blockchain network 20 may include a first node 10, a second node 201, a third node 202, a fourth node 203, etc. When a fifth node 30 receives an upload operation for transaction data A, the fifth node 30 may transmit a data uploading request (for uploading the data to a blockchain) to the blockchain network 20, where the data uploading request carries the transaction data A. The fifth node 30 may be a node in the blockchain network 20, or may be a node independent of the blockchain network 20. When obtaining the transaction data A, a node in the blockchain network 20 broadcasts the obtained transaction data A to other nodes in the blockchain network 20, so as to maintain consistency between transaction data in transaction pools of the nodes.

The above process is described by taking the first node 10 as an example, where the other nodes in the blockchain network 20 (e.g., including the second node 201, the third node 202, the fourth node 203, etc. in FIG. 1) are collectively referred to as a cluster of other nodes. When operating normally, each node (e.g., the first node 10 or a node in the cluster of other nodes) may receive data transmitted from the outside world and perform block uploading processing based on the received data, and may also transmit data to the outside world. In order to ensure the data intercommunication between the nodes, there may be a data connection (communication connection) between the nodes, i.e., between the first node 10 and the second node 201, between the third node 202 and the fourth node 203, etc., and data or blocks can be transmitted between the nodes through the data connection. The data connection between the nodes may be established based on node identifiers. Each node in the blockchain network 20 has a node identifier corresponding to the node, and each node may store node identifiers of other nodes in the blockchain network, to broadcast obtained data or a generated block to the other nodes according to the node identifiers of the other nodes subsequently. For example, the first node 10 may maintain a node identifier list as shown in Table 1, where the node identifier list stores node names and node identifiers of other nodes.

TABLE 1

| Node name | Node identifier |
|---|---|
| Second node 201 | 117.114.151.174 |
| Third node 202 | 117.116.189.145 |
| ... | ... |
| Fourth node 203 | 119.123.789.258 |

The node identifier may be an Internet Protocol (IP) address or any other type of information that can be used to identify the node in the blockchain network 20. In Table 1, the IP address is used as an example for description.

For example, when the node identifier of the first node 10 is 117.116.156.425, the first node 10 may transmit the transaction data A to the second node 201 based on the node identifier 117.114.151.174 of the second node 201, and the second node 201 may determine according to the node identifier 117.116.156.425 of the sender of the transaction data A that the transaction data A is transmitted by the first node 10. Similarly, the first node 10 may transmit the transaction data A to the third node 202 based on the node identifier 117.116.189.145 of the third node 202, and the third node 202 may determine according to the node identifier 117.116.156.425 of the sender of the transaction data A that the transaction data A is transmitted by the first node 10. The same applies to the data transmission between the first node 10 and other nodes (e.g., the fourth node 203).

When the fifth node 30 transmits a data uploading request to the blockchain network 20, the first node 10 is the first to obtain the data uploading request transmitted by the fifth node 30. Further, the first node 10 obtains the transaction data A carried in the data uploading request. The first node 10 may transmit the transaction data A to other nodes in the blockchain network 20 according to the node identifiers in Table 1. Due to network congestion, for example, the second node 201 is processing a large amount of data at this time and suffers serious network congestion, and the third node 202 is processing a small amount of data at this time and is in an idle state. In this case, the second node 201 obtains the transaction data A at time T1, the third node 202 obtains the transaction data A at time T2, and the fourth node 203 obtains the transaction data A at time T3, where T1>T3>T2. That is to say, due to the different degrees of network congestion, each node in the blockchain network 20 obtains the transaction data A at a different time.

Referring to FIG. 1, in one embodiment, each node in the blockchain network 20 establishes a block list for storing historical block information that has been uploaded to the blockchain. For example, the third node 202 obtains 5 transaction data (which may include transaction data 1 to 5) from the transaction pool, generates a block B according to the 5 transaction data, and broadcasts the block B to the first node 10, the second node 201, and the fourth node 203 in the blockchain network 20 (for example, the first node 10, the second node 201, and the fourth node 203 are all consensus nodes in the blockchain network 20) through the above-mentioned data connections. The first node 10, the second node 201, and the fourth node 203 perform consensus verification on the received block B according to a consensus algorithm. When the block B passes the consensus verification (that is, a consensus is reached on the block B), the third node 202 stores the block B in a ledger of the third node 202, and at the same time, the third node 202 stores hash values corresponding to the 5 transaction data in the block B together as a block in a block list of the third node 202. Similarly, the fourth node 203 stores the block B in a ledger of the fourth node 203, and at the same time, the fourth node 203 stores hash values corresponding to the 5 transaction data in the block B together as a block in a block list of the fourth node 203. The same applies to the other nodes in the blockchain network 20 (e.g., the first node 10 and the second node 201). Through the above process, blocks stored in all the nodes in the blockchain network 20 can be kept consistent, and block lists stored in all nodes can also be kept consistent.

When the fourth node 203 is to generate a block, the fourth node 203 first obtains 5 transaction data from its own transaction pool, calculates to-be-checked hash values corresponding to the 5 transaction data, and compares the 5 to-be-checked hash values with historical hash values in the block list of the fourth node 203. When a to-be-checked hash value C among the 5 to-be-checked hash values is the same as one of the historical hash values in the block list, it may be determined that transaction data corresponding to the to-be-checked hash value C is transaction data in a historical block that has been uploaded to the blockchain. In this case, the fourth node 203 may determine the transaction data corresponding to the to-be-checked hash value C as duplicate transaction data, and delete the duplicate transaction data from the transaction pool. At the same time, the fourth node 203 deletes the duplicate transaction data from the 5 transaction data, generates a target block according to the remaining transaction data, and then uploads the target block to the blockchain.

As can be seen from the above, in one embodiment, each node in the blockchain network 20 establishes a block list for storing hash values corresponding to transaction data in historical blocks that have been uploaded to the blockchain. In this way, each node in the blockchain network 20 can use the block list to verify whether the obtained transaction data is transaction data in a historical block that has been uploaded to the blockchain; if yes, determine the obtained transaction data as duplicate transaction data, and forbid generation of a block according to the duplicate transaction data; and if not, may generate a block according to the obtained transaction data, thereby preventing the repeated packaging of the transaction data.

It can be understood that the blockchain-based data processing method provided in the embodiments of this application may be executed by a computer device, the computer device may be implemented as a node in a blockchain network, and the computer device includes but is not limited to a terminal or a server. The server may be an independent physical server, or may be a server cluster or a distributed system formed by at least two physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected through wired or wireless communication, which is not limited in this application.

The fifth node 30, the first node 10, the second node 201, the third node 202, and the fourth node 203 in FIG. 1 may each be a mobile phone, a tablet computer, a notebook computer, a palmtop computer, a smart speaker, a mobile Internet device (MID), a point of sale (POS) machine, a wearable device (for example, a smart watch or a smart bracelet), and the like.

In the embodiments of this application, a blockchain is a new application mode of computer technologies such as distributed data storage, point-to-point (P2P) transmission, consensus mechanisms, and encryption algorithms. The blockchain is essentially a decentralized database and is a string of data blocks generated through association by using a cryptographic method. Each data block includes information of a batch of network transactions, the information being used for verifying the validity of information of the data block (anti-counterfeiting) and generating a next data block. The blockchain may include an underlying blockchain platform, a platform product service layer, and an application service layer.

The blockchain underlying platform may include processing modules such as a user management module, a basic service module, a smart contract module, and an operation supervision module. The user management module is responsible for identity information management of all blockchain participants, including maintenance of public and private key generation (account management), key management, and maintenance of a correspondence between a real identity of a user and a blockchain address (authority management), and when authorized, supervising and auditing transactions of some real identities and providing rule configuration for risk control (risk control audit). The basic service module is deployed on all blockchain node devices to verify the validity of service requests, and record valid requests in a storage after consensus. For a new service request, the basic service module first performs interface adaption analysis and authentication processing (interface adaption), and then encrypts service information by using a consensus algorithm (consensus management), and after the encryption, the information is completely and consistently transmitted to a shared ledger (network communication), and is recorded and stored. The smart contract module is responsible for contract registration and issuance, contract triggering, and contract execution. Developers may define contract logic through a specific programming language and publish the logic on the blockchain (contract registration). According to the logic of contract terms, the smart contract module completes the contract logic by invoking a key or when triggered by another event, which also provides functions of contract upgrade and cancellation. The operation monitoring module is mainly responsible for deployment during the product release process, configuration modification, contract settings, cloud adaptation, and visual outputting of a real-time status during product operation, for example, warning, monitoring network conditions, and monitoring a health status of a node device.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The platform product service layer provides basic capabilities and implementation frameworks for typical applications. Based on the basic capabilities, the developers may superimpose service characteristics to complete a blockchain implementation of the service logic. The application service layer provides a blockchain solution-based application service for use by a service participant.

Figure 2:
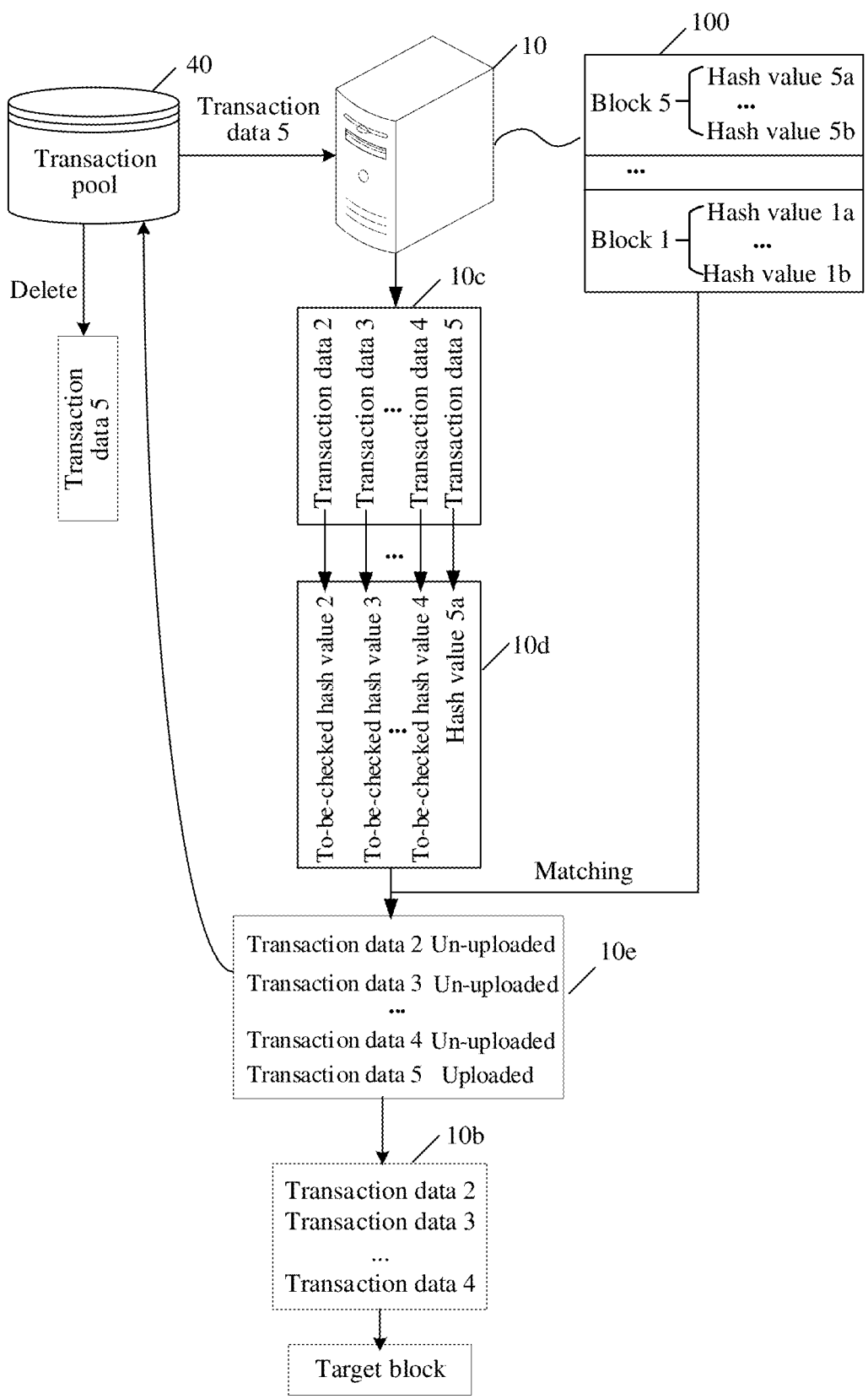
FIG. 2 is a schematic diagram of a blockchain-based data processing scenario according to an embodiment of this application.

FIG. 2 is a schematic diagram of a blockchain-based data processing scenario according to an embodiment of this application. Nodes in a blockchain network may generate blocks in sequence. Referring to FIG. 1, the blockchain network 20 includes the first node 10, the second node 201, the third node 202, and the fourth node 203. For example, the block generation sequence of the blockchain network 20 is the first node 10—the second node 201—the third node 202—the fourth node 203. In this case, the first node 10 is the first to generate a block. After the block generated by the first node 10 passes the consensus verification by the blockchain network 20, the second node 201 starts to generate a block. Similarly, after the block generated by the second node 201 passes the consensus verification by the blockchain network 20, the third node 202 starts to generate a block, and so on. The embodiments of the present application take the first node 10 as an example to describe an example process of generating a target block by a block generation node.

Each block generation node in the blockchain network has a transaction pool for storing transaction data received by the block generation node. As shown in FIG. 2, each time the first node 10 receives transaction data sent by another node, the first node 10 first puts the transaction data into a transaction pool 40. When it is time for the first node 10 to generate a block, the first node 10 obtains target transaction data from the transaction pool 40, and then packages the target transaction data to generate a target block.

As shown in FIG. 2, the first node 10 obtains a target transaction data, i.e., transaction data 5, from the transaction pool 40, and adds the transaction data 5 to a to-be-uploaded transaction sequence 10c. The to-be-uploaded transaction sequence 10c includes transaction data 2, transaction data 3, transaction data 4, transaction data 5, . . . , where the transaction data 2, the transaction data 3, and the transaction data 4 are target transaction data obtained by the first node 10 from the transaction pool 40 before obtaining the transaction data 5. For convenience of distinguishing, the transaction data 2, the transaction data 3, and the transaction data 4 are all referred to as historical target transaction data, and the above transaction data (including target transaction data and historical target transaction data) is used for generating target blocks. The first node 10 sequentially generates to-be-checked hash values corresponding to transaction data in the to-be-uploaded transaction sequence 10c according to a hash algorithm. As shown in a to-be-checked hash value sequence 10d in FIG. 2, a to-be-checked hash value 2 is a hash value of the transaction data 2, a to-be-checked hash value 3 is a hash value of the transaction data 3, a to-be-checked hash value 4 is a hash value of the transaction data 4, a hash value 5a (which is also a to-be-checked hash value) is a hash value of transaction data 5, and so on.

The first node 10 obtains historical block information in a block list 100. The historical block information includes historical hash values, and the historical hash values are hash values of transaction data in historical blocks that have been uploaded to the blockchain. As shown in the block list 100, the historical block information may include block information 5 of a block 5 that has been uploaded to the blockchain, block information 1 of a block 1 that has been uploaded to the blockchain, etc. The block information 5 includes a historical hash value 5 in the block 5 that has been uploaded to the blockchain. The historical hash value 5 is a hash value of transaction data in the block 5 that has been uploaded to the blockchain. As shown in FIG. 2, the historical hash value 5 includes a hash value 5a, a hash value 5b, etc. The block information 1 includes a historical hash value 1 in the block 1 that has been uploaded to the blockchain. The historical hash value 1 is a hash value of transaction data in the block 1 that has been uploaded to the blockchain. The historical hash value 1 includes a hash value 1a, a hash value 5b, etc. A block height corresponding to a historical block that has been uploaded to the blockchain (e.g., block 5, block 1, etc.) is less than a block height of the target block. The hash value 5a, the hash value 5b, etc. can indicate that the corresponding transaction data has been uploaded to the blockchain. The hash value 1a, the hash value 1b, etc. can indicate that the corresponding transaction data has been uploaded to the blockchain. Similarly, all other historical hash values in the block list 100 can indicate that the corresponding transaction data has been packaged into a block and the block has been uploaded to the blockchain.

The first node 10 matches each to-be-checked hash value in the to-be-checked hash value sequence 10d against the historical hash values in the block list 100, for example, matches the to-be-checked hash value 2 against the historical hash values in the block list 100, i.e., the hash value 5a, the hash value 5b, the hash value 1a, and the hash value 1b, one by one, matches the to-be-checked hash value 3 against the historical hash values in the block list 100, i.e., the hash value 5a, the hash value 5b, the hash value 1a, and the hash value 1b, one by one, and so on. When a historical hash value is the same as a to-be-checked hash value (that is, the matching is successful), the first node 10 determines the to-be-checked hash value as a duplicate to-be-checked hash value. Further, it may be determined that the transaction data corresponding to the duplicate to-be-checked hash value is transaction data that has been uploaded to the blockchain, that is, the upload status of the transaction data is an uploaded state. When a to-be-checked hash value is different from all the historical hash values (that is, the matching fails), the first node 10 may determine that the upload status of the transaction data corresponding to the to-be-checked hash value is an un-uploaded state.

For example, when the hash value 5a in the to-be-checked hash value sequence 10d is the same as the hash value 5a in the historical hash values included in the block list 100, the first node 10 may determine that the upload status of the transaction data 5 is the uploaded state. As shown in a state list 10e in FIG. 2, the upload statuses of the transaction data 2 to 4 are all the un-uploaded state, and the upload status of transaction data 5 is the uploaded state.

The first node 10 may match the to-be-checked hash values against the historical hash values in any of the following manners:

1) Each time the first node 10 obtains target transaction data from the transaction pool 40 and generates a to-be-checked hash value corresponding to the target transaction data, the first node 10 immediately matches the generated to-be-checked hash value against the historical hash values in the block list 100. For example, after obtaining the transaction data 2 from the transaction pool 40, the first node 10 adds the transaction data 2 to the to-be-uploaded transaction sequence 10c, and generates a to-be-checked hash value 2 for the transaction data 2. After adding the to-be-checked hash value 2 to the to-be-checked hash value sequence 10d, the first node 10 matches the to-be-checked hash value 2 against the historical hash values in the block list 100, that is, matches the to-be-checked hash value 2 against the historical hash values such as the hash value 5a, the hash value 5b, the hash value 1a, and the hash value 1b one by one, and determines the upload status of the transaction data 2 according to a result of the matching. Then, the first node 10 obtains the transaction data 3 from the transaction pool 40, adds the transaction data 3 to the to-be-uploaded transaction sequence 10c, and generates the to-be-checked hash value 3 of the transaction data 3. After adding the to-be-checked hash value 3 to the to-be-checked hash value sequence 10d, the first node 10 matches the to-be-checked hash value 3 against the historical hash values in the block list 100, that is, matches the to-be-checked hash value 3 against the historical hash values such as the hash value 5a, the hash value 5b, the hash value 1a, and the hash value 1b one by one, and determines the upload status of the transaction data 3 according to a result of the matching. This matching process also applies to the to-be-checked hash values of other transaction data.

2) The first node 10 calculates a quantity of transaction data obtained from the transaction pool 40 as a transaction data quantity; when the transaction data quantity reaches a quantity threshold, matches to-be-checked hash values corresponding to the obtained transaction data against the historical hash values in the block list 100; and when the transaction data quantity does not reach the quantity threshold, continues to obtain new transaction data from the transaction pool 40. For example, in an example where the quantity threshold is 2, when the first node 10 obtains the transaction data 2 from the transaction pool 40, the first node 10 adds the transaction data 2 to the to-be-uploaded transaction sequence 10c, calculates the to-be-checked hash value 2 of the transaction data 2, and adds the to-be-checked hash value 2 to the to-be-checked hash value sequence 10d. Because there is only one transaction data in the to-be-uploaded transaction sequence 10c, the first node 10 does not match the to-be-checked hash value 2 in the to-be-checked hash value sequence 10d against the historical hash values in the block list 100, but instead, obtains the transaction data 3 from the transaction pool 40, adds the transaction data 3 to the to-be-uploaded transaction sequence 10c, calculates the to-be-checked hash value 3 of the transaction data 3, and adds the to-be-checked hash value 3 to the to-be-checked hash value sequence 10d. At this moment, since there are already 2 transaction data in the to-be-uploaded transaction sequence 10c, that is, the quantity threshold of 2 is reached, the first node 10 matches the to-be-checked hash value 2 and the to-be-checked hash value 3 in the to-be-checked hash value sequence 10d respectively against the historical hash values in the block list 100, and the matching process is similar to the matching process in mode 1). Further, the first node 10 may determine the upload status of the transaction data 2 according to a result of the matching of the to-be-checked hash value 2, determine the upload status of the transaction data 3 according to a result of the matching of the to-be-checked hash value 3, and determine whether to upload the transaction data 2 and the transaction data 3 to the blockchain. Then the first node 10 obtains new target transaction data from the transaction pool 40 again. When the quantity of transaction data newly added to the to-be-uploaded transaction sequence 10c reaches the quantity threshold 2, the first node 10 matches the two newly added to-be-checked hash values in the to-be-checked hash value sequence 10d against the historical hash values in the block list 100. The rest can be deduced by analogy. The quantity threshold is less than or equal to a sequence quantity threshold. The sequence quantity threshold is a threshold of the quantity of transaction data in the to-be-uploaded transaction sequence 10c. The sequence quantity threshold may be the same as a threshold of the quantity of transaction data included in a target block. For example, it may be set that the target block includes at most 10 transaction data, and the sequence quantity threshold in the to-be-uploaded transaction sequence 10c is 10.

Referring to FIG. 2, as shown in the state list 10e, the upload statuses of the transaction data 2 to 4 are the un-uploaded state, and the upload status of the transaction data 5 is the uploaded state. In this case, the first node 10 may determine the transaction data 5 as duplicate transaction data, delete the duplicate transaction data from the transaction pool 40, and delete the duplicate transaction data from the to-be-uploaded transaction sequence 10c to obtain a to-be-uploaded transaction sequence 10b. The to-be-uploaded transaction sequence 10b includes the transaction data 2, the transaction data 3, and the transaction data 4. As shown in FIG. 2, all transaction data in the to-be-uploaded transaction sequence 10b are transaction data that have not been uploaded to the blockchain.

The first node 10 generates a target block according to the to-be-uploaded transaction sequence 10b, and broadcasts the target block to a consensus network (which is a network composed of consensus nodes in the blockchain network) in the blockchain network, so that the consensus nodes perform consensus processing on the target block. After the consensus network reaches a consensus on the target block, the block generation node (e.g., the first node 10) in the blockchain network may add the target block to the ledger. The first node 10 is used as an example for description below. The first node 10 stores block information of the target block (including the hash value of the transaction data 2, the hash value of the transaction data 3, and the hash value of the transaction data 4) in the block list 100. At the same time, the first node 10 deletes the transaction data 2, the transaction data 3, and the transaction data 4 from the transaction pool 40, so that in the subsequent transaction data obtaining and block generation process, the first node 10 will no longer obtain the transaction data 2, the transaction data 3, and the transaction data 4, thereby avoiding the repeated uploading of the transaction data 2, the transaction data 3, and the transaction data 4.

The first node 10 may obtain the target transaction data from the transaction pool 40 in any of the following manners:

1) The first node 10 obtains N target transaction data at a time, where N refers to the above-mentioned sequence quantity threshold, and N is an integer greater than 1. Assuming that N is equal to 5, the first node 10 obtains 5 target transaction data (e.g., transaction data 1, transaction data 2, . . . , transaction data 5) from the transaction pool 40 at a time, adds the 5 target transaction data to the to-be-uploaded transaction sequence 10c, and calculates a to-be-checked hash value of each target transaction data in the to-be-uploaded transaction sequence 10c. The first node 10 matches the obtained 5 to-be-checked hash values respectively against the historical hash values in the block list 100. If a to-be-checked hash value is the same as one of the historical hash values, it indicates that the transaction data corresponding to the to-be-checked hash value is transaction data that has been uploaded to the blockchain. Further, the first node 10 may delete the transaction data that has been uploaded to the blockchain from the to-be-uploaded transaction sequence 10c, and delete the transaction data that has been uploaded to the blockchain from the transaction pool 40.

Subsequently, the first node 10 may package the remaining 4 target transaction data in the to-be-uploaded transaction sequence 10c (assuming that the 4 target transaction data is transaction data that has not been uploaded to the blockchain) to generate a target block. The first node 10 may then obtain a target transaction data from the transaction pool 40, e.g., transaction data 6, add the transaction data 6 to the to-be-uploaded transaction sequence 10c, and obtain a to-be-checked hash value of the transaction data 6 according to a hash algorithm. Then the first node 10 matches the to-be-checked hash value of the transaction data 6 against the historical hash values in the block list 100 one by one, and determines an upload status of the transaction data 6 according to a result of the matching. When the upload status of the transaction data 6 is the un-uploaded state, the first node 10 generates a target block according to the to-be-uploaded transaction sequence 10c. When the upload status of the transaction data 6 is the uploaded state, the first node 10 deletes the transaction data 6 from the to-be-uploaded transaction sequence 10c, deletes the transaction data 6 from the transaction pool 40, and continues to obtain next target transaction data from the transaction pool 40, until the quantity of transaction data in the to-be-uploaded transaction sequence 10b reaches 5.

2) The first node 10 obtains one target transaction data from the transaction pool 40 at a time, adds the target transaction data to the to-be-uploaded transaction sequence 10c, generates a to-be-checked hash value corresponding to the target transaction data, and adds the to-be-checked hash value to the to-be-checked hash value sequence 10d. The first node 10 repeats this process until the quantity of transaction data in the to-be-uploaded transaction sequence 10b reaches N (e.g., 5). For the process of matching the to-be-checked hash value against the historical hash values, reference may be made to the above matching process.
  3) The first node 10 obtains at least two target transaction data at a time (where a transaction data quantity corresponding to the at least two target transaction data is less than the above-mentioned sequence quantity threshold), adds the at least two target transaction data to the to-be-uploaded transaction sequence 10c, generates to-be-checked hash values corresponding to the at least two target transaction data, and adds the to-be-checked hash values to the to-be-checked hash value sequence 10d. The first node 10 repeats this process until the quantity of transaction data in the to-be-uploaded transaction sequence 10b reaches N (e.g., 5). For the process of matching the at least two to-be-checked hash values against the historical hash values, reference may be made to the above matching process.

The first node 10 may be a consensus node, a data node, or a lightweight node in the blockchain network, which is not limited herein.

The above process is to first check target transaction data according to the block list, and then generate a target block according to the target transaction data when the target transaction data is in the un-uploaded state. In some embodiments, when a block generation node (which may be a data node or a lightweight node in the blockchain network) is to generate a target block, the block generation node may directly generate a target block without checking the target transaction data, and broadcast the target block to the consensus network. Then, each consensus node in the consensus network checks the target transaction data included in the target block according to the block list. A description is given below by taking the consensus node A as an example. For the checking process of other consensus nodes, reference may be made to the following description. A consensus node A obtains the target block transmitted by the block generation node, and obtains the target transaction data in the target block. The consensus node A obtains a to-be-checked hash value of the target transaction data, and obtains a block list of historical blocks that have been uploaded to the blockchain. The historical hash values are hash values of transaction data in historical blocks that have been uploaded to the blockchain. The consensus node A determines the upload status of the target transaction data according to the block list and the to-be-checked hash value. The consensus node A determines that the target block fails consensus verification, when the upload status of the target transaction data is an uploaded state; and performs consensus processing on the target block, when the upload status of the target transaction data is an un-uploaded state.

Figure 3:
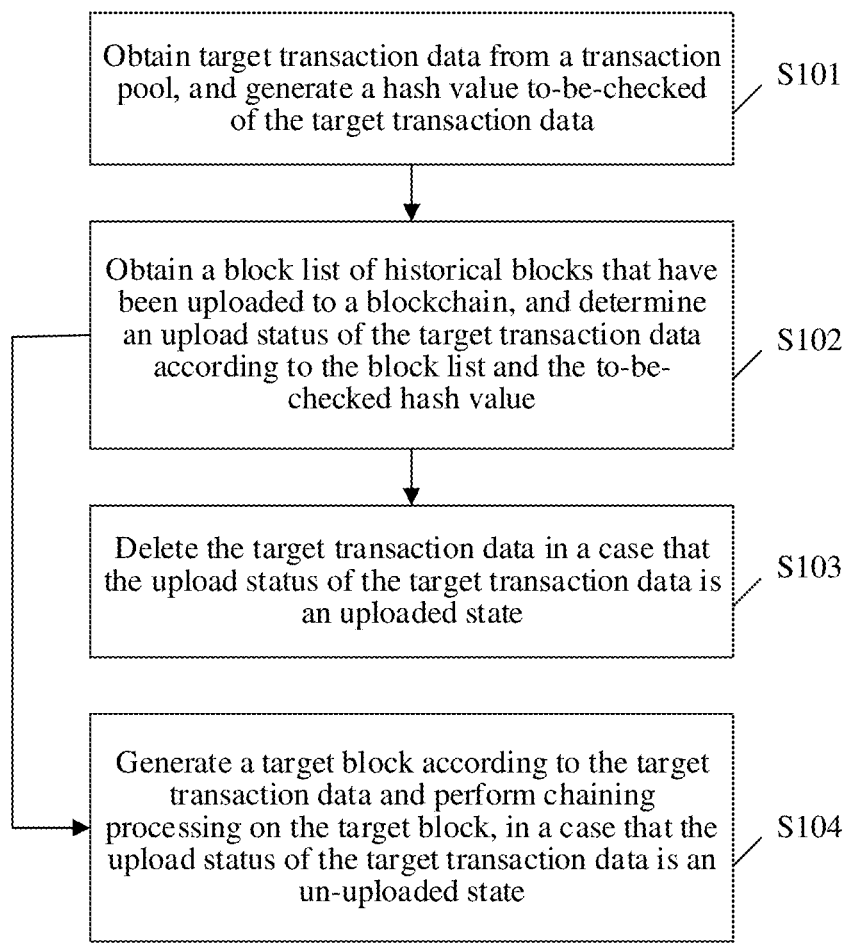
FIG. 3 is a schematic flowchart of a blockchain-based data processing method according to an embodiment of this application.

FIG. 3 is a schematic flowchart of a blockchain-based data processing method according to an embodiment of this application. As shown in FIG. 3, the data processing method includes the following steps.

Step S101. Obtain target transaction data from a transaction pool, and generate a to-be-checked hash value of the target transaction data.

For example, the target transaction data is obtained from the transaction pool, and the target transaction data is added to a to-be-uploaded transaction sequence, where the to-be-uploaded transaction sequence is used for generating a target block.

Figure 4:
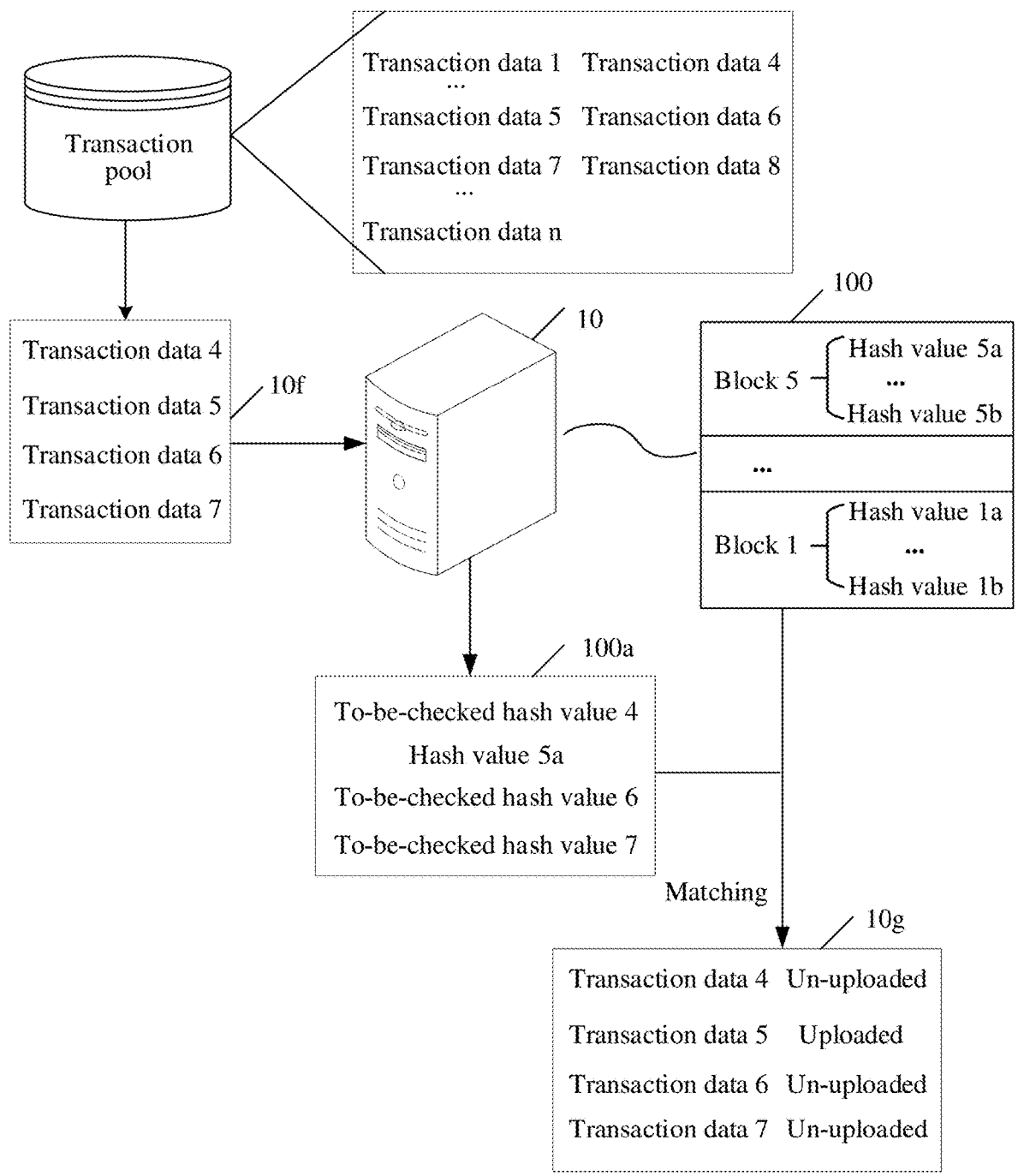
FIG. 4 is a schematic diagram of a blockchain-based data processing scenario according to an embodiment of this application.

FIG. 4 is a schematic diagram of a blockchain-based data processing scenario according to an embodiment of this application. When the first node 10 obtains transaction data transmitted by the outside world, the first node 10 may store the transaction data in a transaction pool. When the first node 10 is to generate a block, the first node 10 may obtain transaction data from the transaction pool, and use the transaction data obtained as target transaction data. As shown in FIG. 4, the transaction pool corresponding to the first node 10 stores transaction data 1, . . . , transaction data 4, transaction data 5, transaction data 6, transaction data 7, transaction data 8, . . . , transaction data n. When the first node 10 is to generate a block, the first node 10 obtains target transaction data 10f from the transaction pool. The target transaction data 10f includes the transaction data 4, the transaction data 5, the transaction data 6, and the transaction data 7. According to a hash algorithm, the first node 10 calculates a to-be-checked hash value 4 of the transaction data 4, a to-be-checked hash value 5 of the transaction data 5 (i.e., a hash value 5a in FIG. 4), a to-be-checked hash value 6 of the transaction data 6, and a to-be-checked hash value 7 of the transaction data 7.

The first node 10 may first add the target transaction data 10f to a to-be-uploaded transaction sequence, and then match to-be-checked hash values corresponding to transaction data in the to-be-uploaded transaction sequence against the historical hash values in the block list 100. For the two processes, reference may be made to the embodiment corresponding to FIG. 2. Herein, the description is given mainly on the process where the first node 10 first matches the to-be-checked hash values corresponding to the transaction data in the target transaction data 10f against the historical hash values in the block list 100, and then determines according to the matching result corresponding to each transaction data whether to add the transaction data to the to-be-uploaded transaction sequence.

Step S102: Obtain a block list of historical blocks that have been uploaded to a blockchain, and determine an upload status of the target transaction data according to the block list and the to-be-checked hash value.

For example, historical block information in a block list is obtained. The historical block information includes historical hash values, and the historical hash values are hash values of transaction data in the historical blocks. The historical hash values in the historical block information are matched against the to-be-checked hash value. It is determined that the upload status of the target transaction data is the uploaded state, when one of the historical hash values is the same as the to-be-checked hash value (that is, the matching is successful). It is determined that the upload status of the target transaction data is the un-uploaded state, when none of the historical hash values is the same as the to-be-checked hash value (that is, the matching fails).

As shown in FIG. 4, the first node 10 obtains historical block information in a block list 100. The historical block information includes historical hash values, and the historical hash values are hash values of transaction data in historical blocks that have been uploaded to the blockchain. As shown in the block list 100, the historical block information may include block information 5 of a block 5 that has been uploaded to the blockchain, block information 1 of a block 1 that has been uploaded to the blockchain, etc. The block information 5 includes a historical hash value 5 in the block 5 that has been uploaded to the blockchain. The historical hash value 5 includes a hash value of transaction data in the block 5 that has been uploaded to the blockchain, for example, includes a hash value 5a, a hash value 5b, etc. The block information 1 includes a historical hash value 1 in the block 1 that has been uploaded to the blockchain. The historical hash value 1 includes a hash value of transaction data in the block 1 that has been uploaded to the blockchain, for example, includes a hash value 1a, a hash value 1b, etc. A block height corresponding to a block that has been uploaded to the blockchain (e.g., block 5, block 1, etc.) is less than a block height of the target block. The hash value 5a and the hash value 5b can indicate that the corresponding transaction data has been uploaded to the blockchain, and the same is true for the hash value 1a, the hash value 1b, and other historical hash values.

The to-be-checked hash value corresponding to each transaction data in the target transaction data 10f is added to the to-be-checked hash value sequence 100a. Since the transaction data 4, the transaction data 5, the transaction data 6, and the transaction data 7 are obtained by the first node 10 at a time, the to-be-checked hash value 4, the hash value 5a, the to-be-checked hash value 6, and the to-be-checked hash value 7 in the to-be-checked hash value sequence 100a have not been matched against the historical hash values in the block list 100. Therefore, the first node 10 matches the to-be-checked hash value 4 against the historical hash values such as the hash value 5a, the hash value 5b, the hash value 1a, and the hash value 1b one by one. When one of the historical hash values is the same as the to-be-checked hash value 4, the first node 10 may determine that the upload status of the transaction data 4 is the uploaded state. When all the historical hash values are different from the to-be-checked hash value 4, the first node 10 may determine that the upload status of the transaction data 4 is the un-uploaded state. The process of matching the remaining to-be-checked hash values in the to-be-checked hash value sequence 100a against the historical hash values in the block list 100 is similar to the above-mentioned process. It may be determined that the hash value 5a in the to-be-checked hash value sequence 100a is the same as the hash value 5a in the block information 5 in the block list 100, so the first node 10 can generate the state list 10g in FIG. 4.

Step S103. Delete the target transaction data when the upload status of the target transaction data is an uploaded state.

For example, when the upload status of the target transaction data is the uploaded state, the target transaction data is deleted from the to-be-uploaded transaction sequence (provided that the to-be-uploaded transaction sequence exists), and the target transaction data is deleted from the transaction pool.

Referring to FIG. 2, as shown in the state list 10e in FIG. 2, the upload statuses of the transaction data 2 to 4 are the un-uploaded state, and the upload status of the transaction data 5 is the uploaded state. In this case, the first node 10 may determine the transaction data 5 as duplicate transaction data, delete the duplicate transaction data from the transaction pool 40, and delete the duplicate transaction data from the to-be-uploaded transaction sequence 10c to obtain a to-be-uploaded transaction sequence 10b. As shown in FIG. 2, the transaction data in the to-be-uploaded transaction sequence 10b are all transaction data that have not been uploaded to the blockchain.

Step S104. Generate a target block according to the target transaction data and perform uploading processing on the target block, when the upload status of the target transaction data is an un-uploaded state.

When the upload status of the target transaction data is the un-uploaded state, it indicates that the target transaction data has not been uploaded to the blockchain, so a target block is generated according to the target transaction data and uploaded to the blockchain.

In some embodiments, when the upload status of the target transaction data is the un-uploaded state, the target transaction data is added to the to-be-uploaded transaction sequence; a quantity of transaction data in the to-be-uploaded transaction sequence is determined as a transaction data quantity; a quantity difference between the sequence quantity threshold and the transaction data quantity is used as a supplementary quantity, when the transaction data quantity is less than a sequence quantity threshold; supplementary transaction data is obtained from the transaction pool, a quantity of the supplementary transaction data being equal to the supplementary quantity; and the target block is generated according to the supplementary transaction data and the to-be-uploaded transaction sequence.

Figure 5:
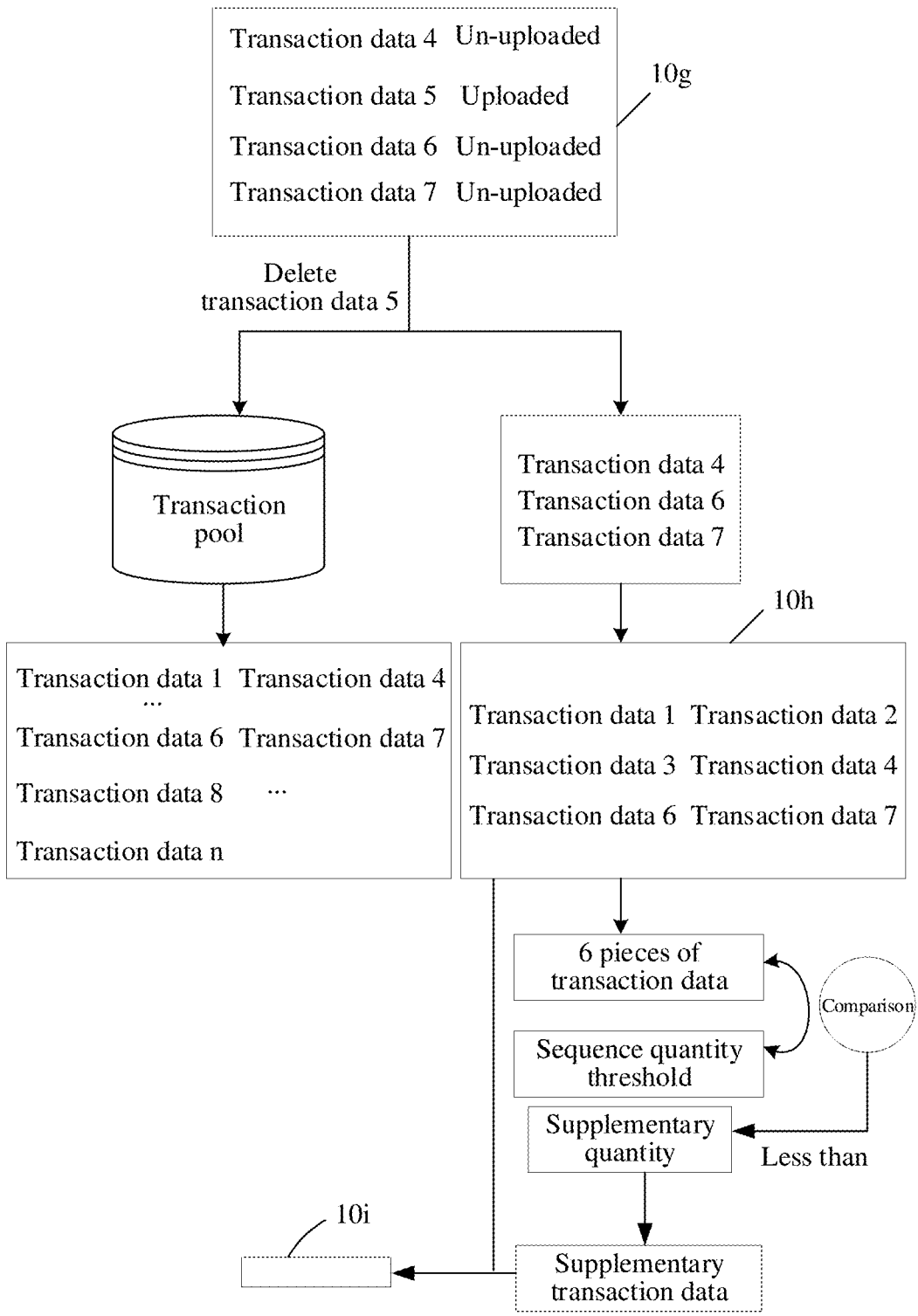
FIG. 5 is a schematic diagram of a blockchain-based data processing scenario according to an embodiment of this application.

FIG. 5 is a schematic diagram of a blockchain-based data processing scenario according to an embodiment of this application. The data processing scenario is described by taking the first node 10 in FIG. 4 as an example. It can be seen from the state list 10g in FIG. 5 that the upload statuses of the transaction data 4, the transaction data 6, and the transaction data 7 are all the un-uploaded state, and the upload status of the transaction data 5 is the uploaded state, i.e., the transaction data 5 has been packaged and uploaded to the blockchain by a node in the blockchain network before, and is duplicate transaction data. The first node 10 deletes the transaction data 5 from the transaction pool, after which the transaction pool still stores the transaction data 1, . . . , the transaction data 4, the transaction data 6, the transaction data 7, the transaction data 8, . . . , the transaction data n. The first node 10 adds the transaction data 4, the transaction data 6, and the transaction data 7 to a to-be-uploaded transaction sequence 10h. As shown in FIG. 5, the to-be-uploaded transaction sequence 10h includes the transaction data 1, the transaction data 2, and the transaction data 3, the transaction data 4, the transaction data 6 and the transaction data 7, among which the transaction data 1, the transaction data 2, and the transaction data 3 are the target transaction data previously obtained by the first node 10, and the upload statuses corresponding to the transaction data 1, the transaction data 2, the transaction data 3 are all the un-uploaded state.

The first node 10 calculates a quantity of transaction data in the to-be-uploaded transaction sequence 10h to determine a transaction data quantity being 6, and compares the transaction data quantity with a sequence number threshold. When the transaction data quantity is equal to the sequence number threshold (that is, the sequence number threshold is 6), the first node 10 generates a target block according to the transaction data 1, the transaction data 2, the transaction data 3, the transaction data 4, the transaction data 6, and the transaction data 7. When the transaction data quantity is less than the sequence quantity threshold (for example, the sequence quantity threshold is 8), the first node 10 uses a quantity difference (which is 2) between the sequence quantity threshold and the transaction data quantity as a supplementary quantity. The first node 10 obtains 2 supplementary transaction data (for example, transaction data 8 and transaction data 9) from the transaction pool. Then the first node 10 calculates to-be-checked hash values corresponding to the transaction data 8 and the transaction data 9 respectively, and subsequently performs a matching process which is similar to that described above. As shown in FIG. 5, the first node 10 generates a target block 10i according to the supplementary transaction data and the to-be-uploaded transaction sequence 10h. Then the first node 10 broadcasts the target block 10i to consensus nodes in the consensus network, so that the consensus nodes in the consensus network perform consensus processing on the target block 10i. When the consensus network reaches a consensus on the target block 10i, each node in the blockchain network (which may include consensus nodes, data nodes and light-weight nodes) stores the target block 10i and the consensus result in a ledger thereof. In this way, it can be ensured that the quantity of transaction data in the target block is equal to the sequence quantity threshold, that is, it can be ensured that computing resources consumed in the uploading process are fully utilized.

In some embodiments, after step S104, the method further includes: determining target block information of the target block, when uploading of the target block is complete, the target block information includes a hash value of transaction data in the target block; and updating the block list according to the target block information, and deleting the transaction data in the target block from the transaction pool.

The block list may be updated according to the target block information of the target block, so as to ensure the real-timeliness and accuracy of the block list. In addition, the transaction data in the target block may also be deleted from the transaction pool, thereby avoiding repeated uploading of the transaction data.

In some embodiments, the updating of the block list according to the target block information may be implemented in this way: determining a quantity of historical block information in the block list as a block information quantity; adding the target block information to the block list, when the block information quantity is less than a list quantity threshold; and updating the historical block information with an earliest storage timestamp in the block list with the target block information, when the block information quantity is equal to the list quantity threshold.

Figure 6:
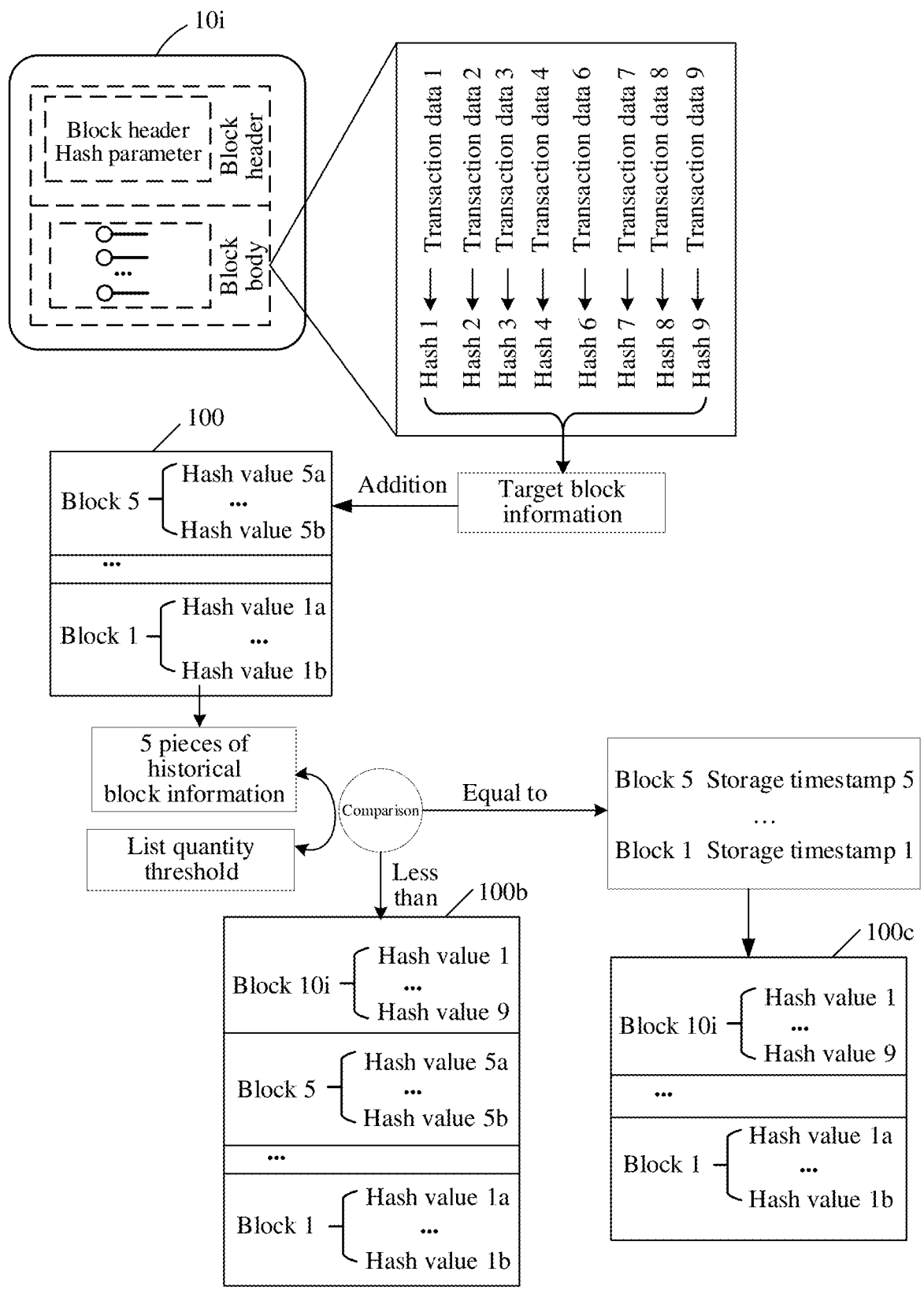
FIG. 6 is a schematic diagram of a blockchain-based data processing scenario according to an embodiment of this application.

This embodiment is described by taking the first node 10 in FIG. 2 as an example. The blockchain is composed of "blocks" connected in series. FIG. 6 is a schematic diagram of a blockchain-based data processing scenario according to an embodiment of this application. As shown in FIG. 6, a target block 10i includes a block header and a block body. The block header may store a block header hash parameter. The block header hash parameter may include a hash value of transaction data of a current block, a block header hash value of a parent block, a version number, a timestamp, a difficulty value, etc. The block body of the target block 10i includes target transaction data and a hash value of the target transaction data. It can be known from steps S101 to S103 that the upload status of the transaction data 5 obtained by the first node 10 from the transaction pool is the uploaded state, so the first node 10 deletes the transaction data 5 from the transaction pool and deletes the transaction data 5 from the target transaction data (that is, does not use the transaction data 5 as target transaction data). Therefore, the block body of the target block 10i does not contain the transaction data 5 and the hash value of the transaction data 5. As shown in FIG. 6, the block body includes transaction data 1 to 4 and transaction data 6 to 9, and also includes a hash value 1 of the transaction data 1 (e.g., hash 1 in FIG. 6), and a hash value 2 of the transaction data 2, a hash value 3 of the transaction data 3, a hash value 4 of the transaction data 4, a hash value 6 of the transaction data 6, a hash value 7 of the transaction data 7, a hash value 8 of the transaction data 8, and a hash value 9 of the transaction data 9. The transaction data 8 and the transaction data 9 are supplementary transaction data. The first node 10 uses the hash values 1 to 4 and the hash values 6 to 9 together as target block information of the target block 10i.

The first node 10 determines a quantity of historical block information in the block list 100 as a block information quantity. As shown in FIG. 6, the block list 100 stores historical block information respectively corresponding to a block 1, a block 2, . . . , a block 5, i.e., stores 5 historical block information. The first node 10 compares the block information quantity (which is 5) with the list quantity threshold. If the list quantity threshold is greater than 5, it indicates that the block information quantity is less than the list quantity threshold, and the target block information may be directly added to the block list 100, as shown in a block list 100b. The block heights corresponding to the block 1, . . . , and the block 5 are all less than the block height of the block 10i. If the list quantity threshold is equal to 5, it indicates that the block information quantity is equal to the list threshold quantity. In this case, the first node 10 obtains a storage timestamp 5 of the block 5, . . . , a storage timestamp 1 of the block 1, and determines an earliest storage timestamp from the storage timestamp 5, . . . , the storage timestamp 1. The first node 10 may determine that a historical block with the earliest storage timestamp is a historical block with a smallest block height, then determine that the historical block information of the historical block with the smallest block height is historical block information with an earliest storage time, and update the historical block information with the earliest storage timestamp with the target block information. For example, the block 5 is the historical block with the earliest storage timestamp, and the historical block information of the block 5 is replaced with the target block information, as shown in a block list 100c. By the above method, the accuracy of updating the block list can be improved, thereby ensuring that the latest block information is stored in the block list.

In addition, as shown in FIG. 6, when the uploading of the target block 10i to the blockchain is complete, the first node 10 deletes the transaction data in the target block 10i from the transaction pool, that is, deletes the transaction data 1 to 4 and the transaction data 6 to 9 from the transaction pool, thereby preventing the repeated uploading of the transaction data 1 to 4 and the transaction data 6 to 9 to the blockchain.

In some embodiments, between any steps, the method further includes: determining a node quantity of nodes in a blockchain network, when a first system time reaches a first heartbeat update cycle; and updating a list quantity threshold of the block list according to the node quantity to obtain an updated list quantity threshold, there is a proportional relationship between the node quantity and the updated list quantity threshold.

Figure 7A:
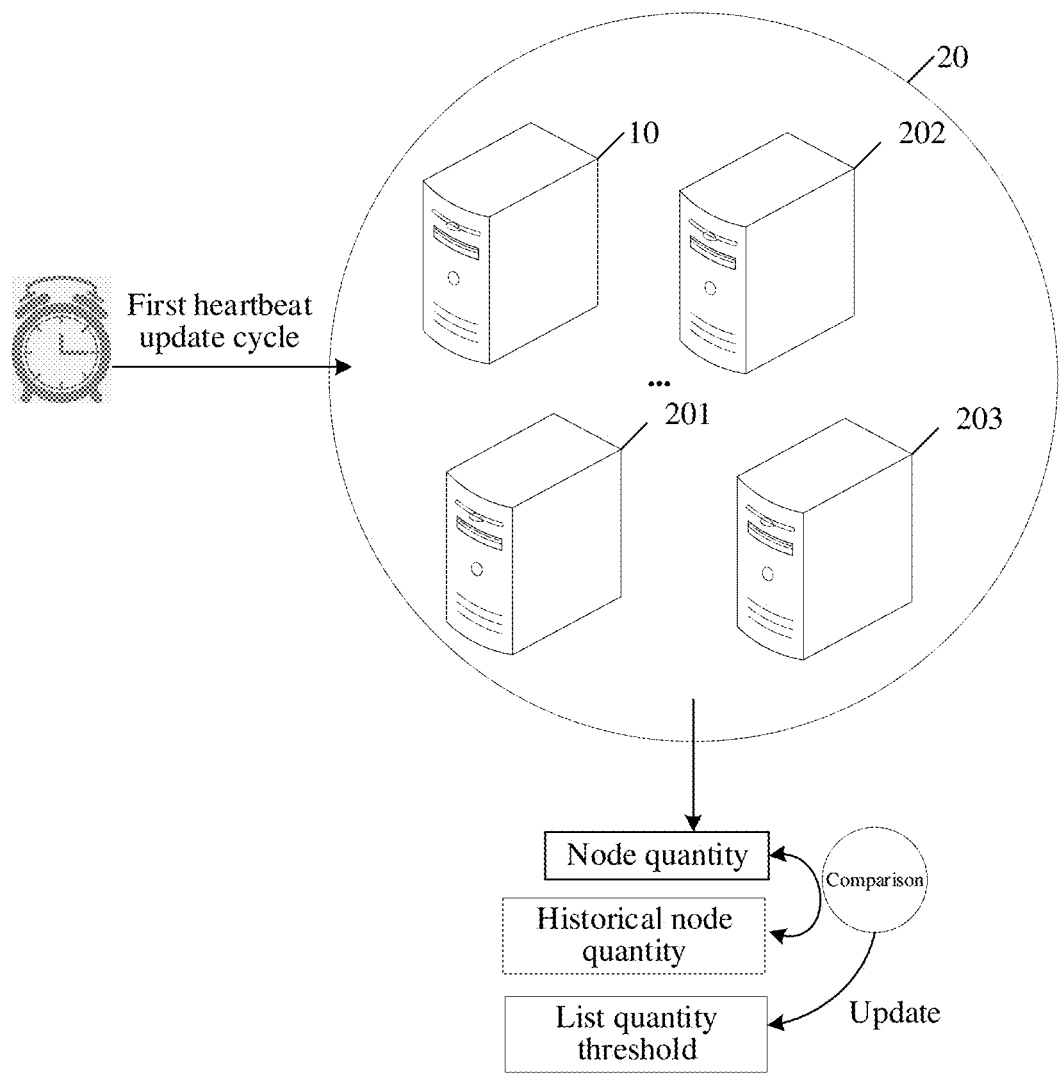
FIG. 7a is a schematic diagram of a blockchain-based data processing scenario according to an embodiment of this application.

FIG. 7a is a schematic diagram of a blockchain-based data processing scenario according to an embodiment of this application. Assuming that the first heartbeat update cycle set in the blockchain network 20 is 10 minutes, each node in the blockchain network 20 (e.g., the first node 10, the second node 201, the third node 202, the fourth node 203, etc.) obtains the quantity of nodes in the blockchain network 20 every 10 minutes. A description will be given below by taking the first node 10 as an example. The first node 10 counts the quantity of nodes in the blockchain network 20 at 9:50, and determines that the quantity of nodes is 10. At 10:00, the first node 10 counts the quantity of nodes in the blockchain network 20 again. At this moment, the quantity of nodes (i.e., 10) obtained at 9:50 is called a historical node quantity. The first node 10 compares the quantity of nodes obtained at 10:00 with the historical node quantity. If the quantity of nodes obtained at 10:00 is 20, it means that during the period from 9:50 to 10:00, the quantity of new nodes having joined the blockchain network 20 is greater than the quantity of nodes leaving the blockchain network by 10. In this case, the list quantity threshold is increased. If the quantity of nodes obtained at 10:00 is 8, it means that during the period from 9:50 to 10:00, the quantity of new nodes having joined the blockchain network 20 is less than the quantity of nodes leaving the blockchain network by 2. In this case, the list quantity threshold is decreased. If the quantity of nodes obtained at 10:00 is equal to the historical node quantity, it means that during the period from 9:50 to 10:00, the quantity of new nodes having joined the blockchain network 20 is equal to the quantity of nodes leaving the blockchain network. In this case, the list quantity threshold is not updated.

The proportional relationship between the quantity of nodes and the updated list quantity threshold are not limited in the embodiments of the present application, and may be set according to actual application scenarios.

In some embodiments, between any steps, the method further includes: determining at least two historical hash values in the block list, when a second system time reaches a second heartbeat update cycle; generating a to-be-filtered hash value of transaction data in the transaction pool; and matching the historical hash values against the to-be-filtered hash value, and performing filtering processing on the transaction data in the transaction pool according to a result of the matching.

Figure 7B:
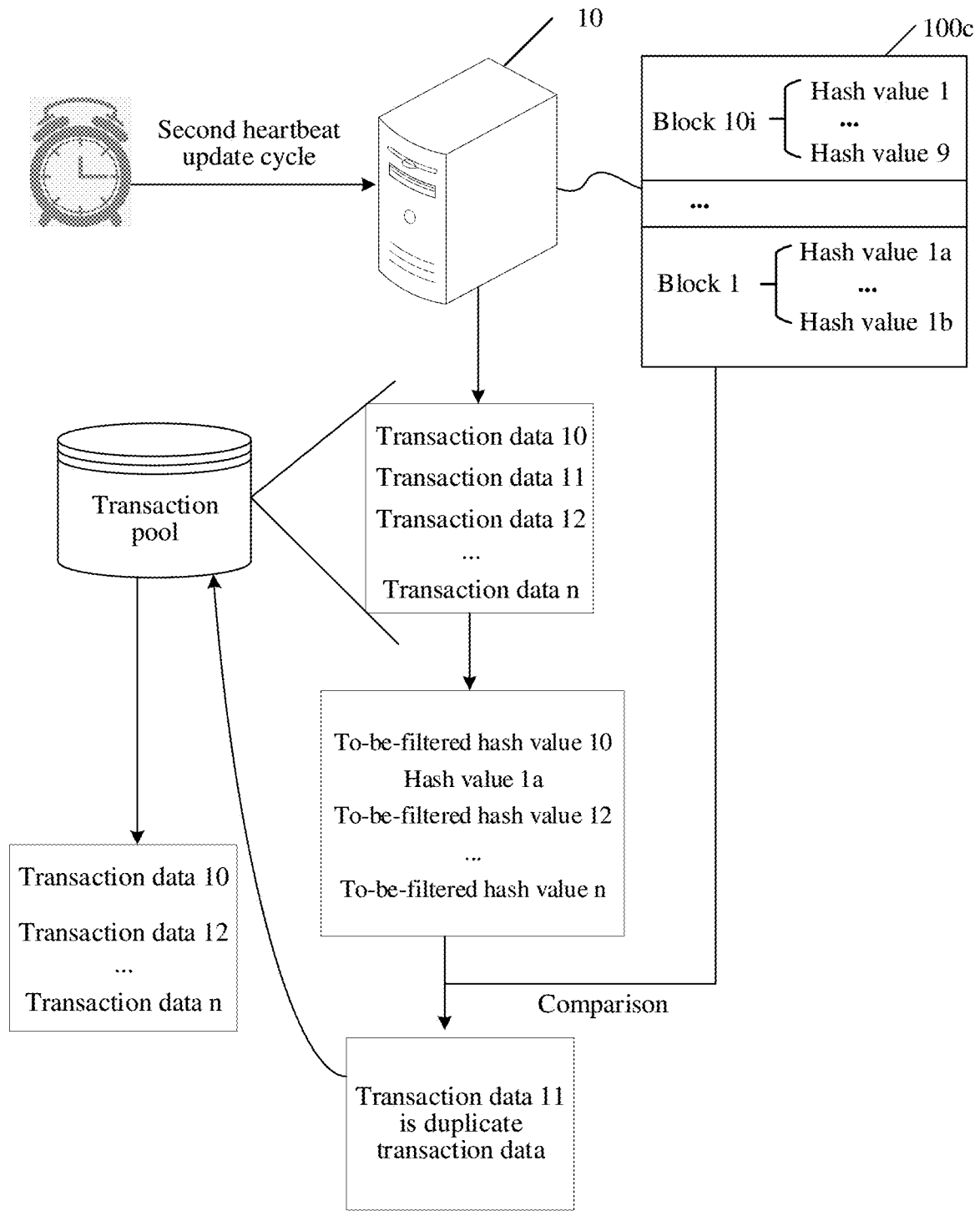
FIG. 7b is a schematic diagram of a blockchain-based data processing scenario according to an embodiment of this application.

FIG. 7b is a schematic diagram of a blockchain-based data processing scenario according to an embodiment of this application. When the second system time set by the first node 10 reaches the second heartbeat update cycle, at least two historical hash values (which may be all or part of the historical hash values) in the block list 100c are obtained. As shown in FIG. 7b, the at least two historical hash values include a historical hash value 10i of a block 10i that has been uploaded to the blockchain, . . . , a historical hash value 1 of a block 1 that has been uploaded to the blockchain. The historical hash value 10i includes a hash value 1, . . . , a hash value 9. The historical hash value 1 includes a hash value 1a, a hash value 1b, etc. The first node 10 obtains all transaction data in the transaction pool. For example, the transaction pool stores transaction data 10, transaction data 11, transaction data 12, . . . , transaction data n. According to a hash algorithm, the first node 10 respectively calculates hash values of the transaction data in the transaction pool (which are referred to as to-be-filtered hash values for the convenience of distinguishing), including a to-be-filtered hash value 10 of the transaction data 10 and a to-be-filtered hash value 11 of the transaction data 11 (that is, the hash value 1a in FIG. 7b), a to-be-filtered hash value 12 of the transaction data 12, . . . , a to-be-filtered hash value n of the transaction data n. For each of the to-be-filtered hash values obtained, the first node 10 matches the to-be-filtered hash value against the historical hash values in the block list 100c one by one, for example, matches the to-be-filtered hash value 10 against the hash value 1, . . . , the hash value 9, . . . , the hash value 1a, and the hash value 1b, etc. one by one. When one of the historical hash values is the same as the to-be-filtered hash value 10, the first node 10 may determine the transaction data as duplicate transaction data. When none of the historical hash values is the same as the to-be-filtered hash value 10, the first node 10 may determine the transaction data 10 as transaction data to be uploaded to the blockchain. The rest can be reduced by analogy. It may be determined that the hash value 1a of the transaction data 11 is the same as the hash value 1a in the historical hash value 1 in the block list 100, so the first node 10 may determine that the transaction data 11 is duplicate transaction data. As shown in FIG. 7b, the first node 10 deletes the transaction data 11 from the transaction pool, that is, performs a filtering process. After the filtering process is complete, the transaction pool still stores the transaction data 10, the transaction data 12, . . . , the transaction data n.

In the embodiment of this application, each node in a blockchain network establishes a block list for storing historical block information that has been uploaded to the blockchain, to detect whether target transaction data obtained from the transaction pool has been packaged and uploaded to the blockchain. In this way, repeated packaging and uploading of transaction data can be avoided, thereby reducing the waste of storage resources.

Figure 8:
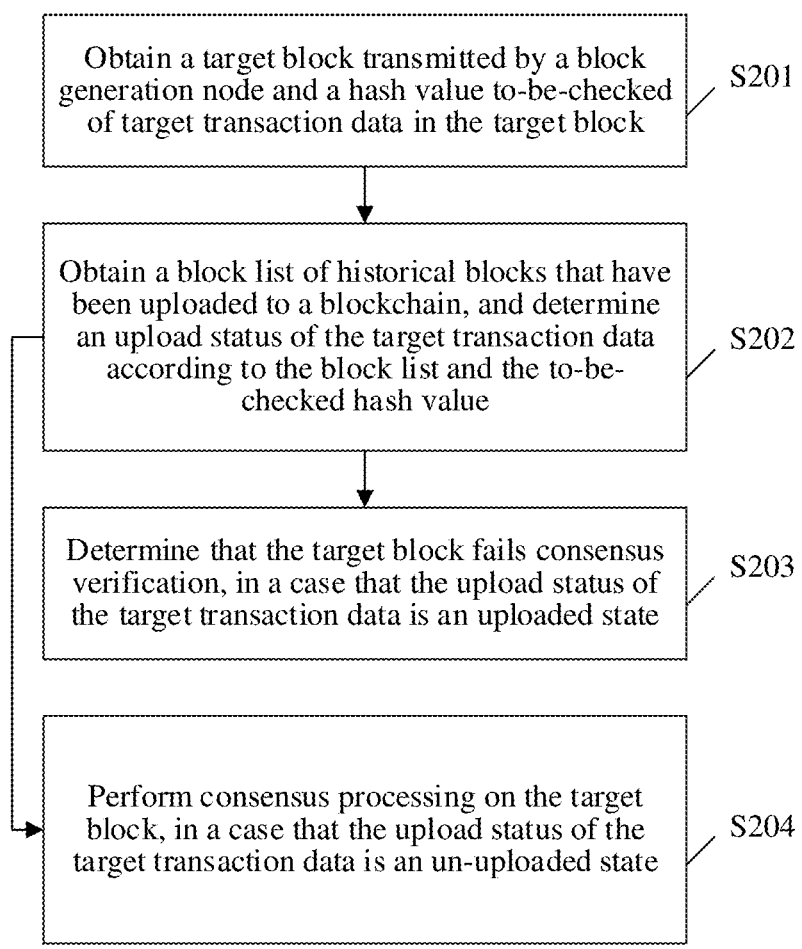
FIG. 8 is a schematic flowchart of a blockchain-based data processing method according to an embodiment of this application.

FIG. 8 is a schematic flowchart of a blockchain-based data processing method according to an embodiment of this application. The method is executed by a computer device. The computer device may be implemented as a consensus node in a blockchain network. As shown in FIG. 8, the method includes the following steps.

Step S201. Obtain a target block transmitted by a block generation node and a to-be-checked hash value of target transaction data in the target block.

For example, the block generation node may be a data node in the blockchain network, or a lightweight node in the blockchain network, which is not limited herein.

The consensus node obtains the target block transmitted by the block generation node. Different from the embodiment corresponding to FIG. 3, a hash value (corresponding to the target transaction data) included in the target block in this embodiment has not been matched against the block list, and is a to-be-checked hash value. Referring to FIG. 6, the block body of the target block 10i includes the target transaction data and the to-be-checked hash value of the target transaction data, that is, the hash value 1, the hash value 2, the hash value 3, the hash value 4, the hash value 6, the hash value 7, the hash value 8, and the hash value 9 as shown in FIG. 6.

Step S202: Obtain a block list of historical blocks that have been uploaded to a blockchain, and determine an upload status of the target transaction data according to the block list and the to-be-checked hash value.

For the implementation process of step S202, reference may be made to step S102 in the embodiment corresponding to FIG. 3.

Step S203. Determine that the target block fails consensus verification, when the upload status of the target transaction data is an uploaded state.

For example, when the upload status of the target transaction data is the uploaded state, the consensus node may determine that the target transaction data is duplicate transaction data, i.e., a historical block having been generated by a block generation node and having passed consensus verification in the consensus network. Because the target block contains the duplicate transaction data, the consensus nodes fail to reach a consensus on the target block.

Step S204. Perform consensus processing on the target block, when the upload status of the target transaction data is an un-uploaded state.

For the implementation process of step S204, reference may be made to step S104 in the embodiment corresponding to FIG. 3.

In some embodiments, the block list includes historical block information; the historical block information includes historical hash values, and the historical hash values are hash values of transaction data in the historical blocks; and the determining of the upload status of the target transaction data according to the block list and the to-be-checked hash value may be implemented in this way: matching the historical hash values in the historical block information against the to-be-checked hash value, and determining the upload status of the target transaction data according to a result of the matching.

In some embodiments, the determining of the upload status of the target transaction data according to the result of the matching may be implemented in this way: determining that the upload status of the target transaction data is the uploaded state, when the result of the matching is that the matching is successful; and determining that the upload status of the target transaction data is the un-uploaded state, when the result of the matching is that the matching fails.

In some embodiments, after step S204, the method further includes: determining target block information of the target block, when the target block passes consensus verification (i.e., a consensus is reached on the target block), the target block information includes a hash value of transaction data in the target block; and updating the block list according to the target block information.

In some embodiments, after step S204, the method further includes: determining target block information of the target block, when uploading of the target block is complete, the target block information includes a hash value of transaction data in the target block; and updating the block list according to the target block information.

In some embodiments, the updating of the block list according to the target block information may be implemented in this way: determining a quantity of historical block information in the block list as a block information quantity; adding the target block information to the block list, when the block information quantity is less than a list quantity threshold; and updating the historical block information with an earliest storage timestamp in the block list with the target block information, when the block information quantity is equal to the list quantity threshold.

In some embodiments, between any steps, the method further includes: determining a node quantity of nodes in a blockchain network, when a first system time reaches a first heartbeat update cycle; and updating a list quantity threshold of the block list according to the node quantity to obtain an updated list quantity threshold, there is a proportional relationship between the node quantity and the updated list quantity threshold.

In the embodiment of this application, each consensus node in a blockchain network establishes a block list for storing historical block information that has been uploaded to the blockchain, to detect whether target transaction data included in a target block transmitted by a block generation node has been packaged and uploaded to the blockchain. In this way, repeated packaging and uploading of transaction data can be avoided, thereby reducing the waste of storage resources.

Figure 9:
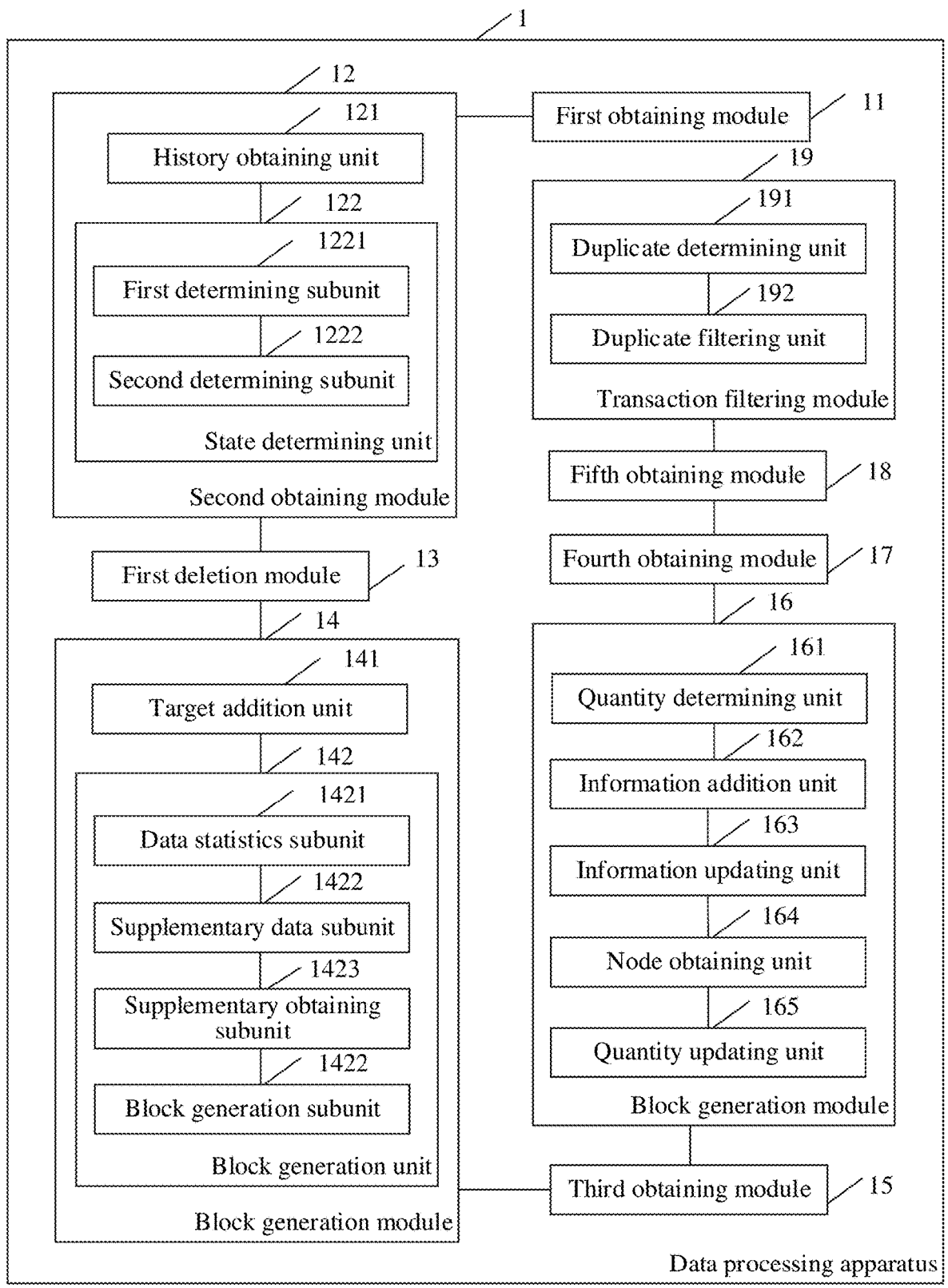
FIG. 9 is a schematic structural diagram of a blockchain-based data processing apparatus according to an embodiment of this application.

FIG. 9 is a schematic structural diagram of a blockchain-based data processing apparatus according to an embodiment of this application. The data processing apparatus may be a computer program (including program code which may also be referred to as program instructions) running in a computer device. For example, the data processing apparatus may be an application software. The data processing apparatus may be configured to execute the corresponding steps in the blockchain-based data processing method provided in the embodiments of this application. As shown in FIG. 9, the data processing apparatus 1 may run in the computer equipment in the embodiment corresponding to FIG. 3. For example, the data processing apparatus 1 may include: a first obtaining module 11, a second obtaining module 12, a first deletion module 13, and a block generation module 14. The modules may be referred to as units or may be a first obtainer 11, a second obtainer 12, a first deletion mechanism 13, and a block generator 14.

The first obtaining module 11 is configured to obtain target transaction data from a transaction pool, and generate a to-be-checked hash value of the target transaction data. The second obtaining module 12 is configured to obtain a block list of historical blocks that have been uploaded to a blockchain, and determine an upload status of the target transaction data according to the block list and the to-be-checked hash value. The first deletion module 13 is configured to delete the target transaction data when the upload status of the target transaction data is an uploaded state. The block generation module 14 is configured to generate a target block according to the target transaction data and perform uploading processing on the target block, when the upload status of the target transaction data is an un-uploaded state. For implementations of functions of the first obtaining module 11, the second obtaining module 12, the first deletion module 13, and the block generation module 14, reference may be made to step S101 to step S104 in the embodiment corresponding to FIG. 3, which will not be repeated here.

In some embodiments, such as shown in FIG. 9, the second obtaining module 12 may include: a history obtaining unit 121 and a status determining unit 122. The history obtaining unit 121 is configured to determine historical block information in the block list, the historical block information includes historical hash values, and the historical hash values are hash values of transaction data in the historical blocks. The status determining unit 122 is configured to match the historical hash values in the historical block information against the to-be-checked hash value, and determine the upload status of the target transaction data according to a result of the matching. For implementations of functions of the history obtaining unit 121 and the status determining unit 122, reference may be made to step S102 in the embodiment corresponding to FIG. 3, which will not be repeated here.

In some embodiments, such as shown in FIG. 9, the status determining unit 122 may include: a first determining subunit 1221 and a second determining subunit 1222. The first determining subunit 1221 is configured to determine that the upload status of the target transaction data is the uploaded state, when the result of the matching is that the matching is successful. The second determining subunit 1222 is configured to determine that the upload status of the target transaction data is the un-uploaded state, when the result of the matching is that the matching fails. For implementations of functions of the first determining subunit 1221 and the second determining subunit 1222, reference may be made to step S102 in the embodiment corresponding to FIG. 3, which will not be repeated here.

In some embodiments, such as shown in FIG. 9, the first obtaining module 11 is further configured to add the target transaction data to a to-be-uploaded transaction sequence, the to-be-uploaded transaction sequence being used for generating the target block; and the first deletion module 13 is further configured to delete the target transaction data from the to-be-uploaded transaction sequence, and delete the target transaction data from the transaction pool. For implementations of functions of the first obtaining module 11 and the first deletion module 13, reference may be made to step S101 and step S103 in the embodiment corresponding to FIG. 3, which will not be repeated here.

In some embodiments, such as shown in FIG. 9, the block generation module 14 may include: a target addition unit 141 and a block generation unit 142. The target addition unit 141 is configured to add the target transaction data to the to-be-uploaded transaction sequence. The block generation unit 142 is configured to generate the target block according to the to-be-uploaded transaction sequence. For implementations of functions of the target addition unit 141 and the block generation unit 142, reference may be made to step S104 in the embodiment corresponding to FIG. 3, which will not be repeated here.

In some embodiments, such as shown in FIG. 9, the block generation unit 142 may include: a data statistics subunit 1421, a supplementary data determining subunit 1422, a supplementary data obtaining subunit 1423, and a block generation subunit 1424. The data statistics subunit 1421 is configured to determine a quantity of transaction data in the to-be-uploaded transaction sequence as a transaction data quantity. The supplementary data determining subunit 1422 is configured to use a quantity difference between the sequence quantity threshold and the transaction data quantity as a supplementary quantity, when the transaction data quantity is less than a sequence quantity threshold. The supplementary data obtaining subunit 1423 is configured to obtain supplementary transaction data from the transaction pool, a quantity of the supplementary transaction data being equal to the supplementary quantity. The block generation subunit 1424 is configured to generate the target block according to the supplementary transaction data and the to-be-uploaded transaction sequence.

In some embodiments, the block generation subunit 1424 is further configured to generate the target block according to the supplementary transaction data and the to-be-uploaded transaction sequence, when an upload status of the supplementary transaction data is the un-uploaded state; and the supplementary data obtaining subunit 1423 is further configured to delete the supplementary transaction data from the transaction pool and obtain new supplementary transaction data from the transaction pool, when the upload status of the supplementary transaction data is the uploaded state. For implementations of functions of the data statistics subunit 1421, the supplementary data determining subunit 1422, the supplementary data obtaining subunit 1423, and the block generation subunit 1424, reference may be made to step S104 in the embodiment corresponding to FIG. 3, which will not be repeated here.

In some embodiments, such as shown in FIG. 9, the data processing apparatus 1 may further include: a third obtaining module 15 and a second deletion module 16. The third obtaining module 15 is configured to determine target block information of the target block, when uploading of the target block is complete, the target block information includes a hash value of transaction data in the target block. The second deletion module 16 is configured to update the block list according to the target block information, and delete the transaction data in the target block from the transaction pool. For implementations of functions of the third obtaining module 15 and the second deletion module 16, reference may be made to step S104 in the embodiment corresponding to FIG. 3, which will not be repeated here.

In some embodiments, such as shown in FIG. 9, the second deletion module 16 may include: a quantity determining unit 161, an information addition unit 162, and an information updating unit 163. The quantity determining unit 161 is configured to determine a quantity of historical block information in the block list as a block information quantity. The information addition unit 162 is configured to add the target block information to the block list, when the block information quantity is less than a list quantity threshold. The information updating unit 163 is configured to update the historical block information with an earliest storage timestamp in the block list with the target block information, when the block information quantity is equal to the list quantity threshold. For implementations of functions of the quantity determining unit 161, the information addition unit 162, and the information updating unit 163, reference may be made to step S104 in the embodiment corresponding to FIG. 3, which will not be repeated here.

In some embodiments, such as shown in FIG. 9, the second deletion module 16 may further include: a node obtaining unit 164 and a quantity updating unit 165. The node obtaining unit 164 is configured to determine a node quantity of nodes in a blockchain network, when a first system time reaches a first heartbeat update cycle. The quantity updating unit 165 is configured to update a list quantity threshold of the block list according to the node quantity to obtain an updated list quantity threshold, there is a proportional relationship between the node quantity and the updated list quantity threshold. For implementations of functions of the node obtaining unit 164 and the quantity updating unit 165, reference may be made to step S104 in the embodiment corresponding to FIG. 3, which will not be repeated here.

In some embodiments, such as shown in FIG. 9, the data processing apparatus 1 may further include: a fourth obtaining module 17, a fifth obtaining module 18, and a transaction filtering module 19. The fourth obtaining module 17 is configured to determine at least two historical hash values in the block list, when a second system time reaches a second heartbeat update cycle. The fifth obtaining module 18 is configured to generate a to-be-filtered hash value of transaction data in the transaction pool. The transaction filtering module 19 is configured to match the historical hash values against the to-be-filtered hash value, and perform filtering processing on the transaction data in the transaction pool according to a result of the matching. For implementations of functions of the fourth obtaining module 17, the fifth obtaining module 18, and the transaction filtering module 19, reference may be made to step S104 in the embodiment corresponding to FIG. 3, which will not be repeated here.

In some embodiments, such as shown in FIG. 9, the transaction filtering module 19 may include: a duplicate determining unit 191 and a duplicate filtering unit 192. The duplicate determining unit 191 is configured to determine the transaction data corresponding to the to-be-filtered hash value as duplicate transaction data, when the result of the matching is that the matching is successful. The duplicate filtering unit 192 is configured to delete the duplicate transaction data from the transaction pool. For implementations of functions of the duplicate determining unit 191 and the duplicate filtering unit 192, reference may be made to step S104 in the embodiment corresponding to FIG. 3.

In some embodiments, the second obtaining module 12 is further configured to: determine a quantity of the target transaction data obtained from the transaction pool as a transaction data quantity; and determine the upload status of the target transaction data according to the block list and the to-be-checked hash value, when the transaction data quantity reaches a quantity threshold; and the first obtaining module 11 is further configured to obtain new target transaction data from the transaction pool, when the transaction data quantity does not reach the quantity threshold.

In some embodiments, the first obtaining module 11 is further configured to perform any one of the following processing: obtaining one target transaction data from the transaction pool at a time; obtaining a quantity of target transaction data from the transaction pool according to a sequence quantity threshold of a to-be-uploaded transaction sequence at a time, the quantity of target transaction data is equal to the sequence quantity threshold, and the to-be-uploaded transaction sequence being used for generating the target block; and obtaining at least two target transaction data from the transaction pool at a time, a quantity of the at least two target transaction data being less than the sequence quantity threshold. The quantity of target transaction data may be referred to as a first quantity.

In the embodiment of this application, each node in a blockchain network establishes a block list for storing historical block information that has been uploaded to the blockchain, to detect whether target transaction data obtained from the transaction pool has been packaged and uploaded to the blockchain. In this way, repeated packaging and uploading of transaction data can be avoided, thereby reducing the waste of storage resources.

Figure 10:
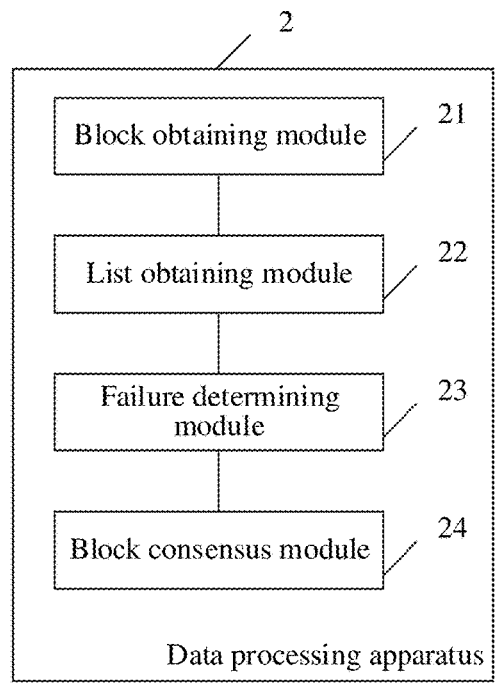
FIG. 10 is a schematic structural diagram of a blockchain-based data processing apparatus according to an embodiment of this application.

FIG. 10 is a schematic structural diagram of a blockchain-based data processing apparatus according to an embodiment of this application. The data processing apparatus may be a computer program (including program code) running in a computer device. For example, the data processing apparatus may be an application software. The data processing apparatus may be configured to execute the corresponding steps in the blockchain-based data processing method provided in the embodiments of this application. As shown in FIG. 10, the data processing apparatus 2 may run in the computer equipment in the embodiment corresponding to FIG. 8. For example, the data processing apparatus 2 may include: a block obtaining module 21, a list obtaining module 22, a failure determining module 23, and a block consensus module 24.

The block obtaining module 21 is configured to obtain a target block transmitted by a block generation node and a to-be-checked hash value of target transaction data in the target block. The list obtaining module 22 is configured to obtain a block list of historical blocks that have been uploaded to a blockchain, and determine an upload status of the target transaction data according to the block list and the to-be-checked hash value. The failure determining module 23 is configured to determine that the target block fails consensus verification, when the upload status of the target transaction data is an uploaded state. The block consensus module 24 is configured to perform consensus processing on the target block, when the upload status of the target transaction data is an un-uploaded state.

In some embodiments, the block list includes historical block information; the historical block information includes historical hash values, and the historical hash values are hash values of transaction data in the historical blocks; and the list obtaining module 22 is further configured to match the historical hash values in the historical block information against the to-be-checked hash value, and determine the upload status of the target transaction data according to a result of the matching.

In some embodiments, the list obtaining module 22 is further configured to determine that the upload status of the target transaction data is the uploaded state, when the result of the matching is that the matching is successful; and determine that the upload status of the target transaction data is the un-uploaded state, when the result of the matching is that the matching fails.

In some embodiments, the block consensus module 24 is further configured to: determine target block information of the target block, when the target block passes consensus verification (i.e., a consensus is reached on the target block), the target block information includes a hash value of transaction data in the target block; and update the block list according to the target block information.

In some embodiments, the block consensus module 24 is further configured to: determine target block information of the target block, when uploading of the target block is complete, the target block information includes a hash value of transaction data in the target block; and update the block list according to the target block information.

In some embodiments, the block consensus module 24 is further configured to: determine a quantity of historical block information in the block list as a block information quantity; add the target block information to the block list, when the block information quantity is less than a list quantity threshold; and update the historical block information with an earliest storage timestamp in the block list with the target block information, when the block information quantity is equal to the list quantity threshold.

In some embodiments, the data processing apparatus 2 further includes a threshold updating module, configured to: determine a node quantity of nodes in a blockchain network, when a first system time reaches a first heartbeat update cycle; and update a list quantity threshold of the block list according to the node quantity to obtain an updated list quantity threshold, there is a proportional relationship between the node quantity and the updated list quantity threshold.

For implementations of functions of the block obtaining module 21, the list obtaining module 22, the failure determining module 23, and the block consensus module 24, reference may be made to step S201 to step S204 in the embodiment corresponding to FIG. 8, which will not be repeated here.

In the embodiment of this application, each consensus node in a blockchain network establishes a block list for storing historical block information that has been uploaded to the blockchain, to detect whether target transaction data included in a target block transmitted by a block generation node has been packaged and uploaded to the blockchain. In this way, repeated packaging and uploading of transaction data can be avoided, thereby reducing the waste of storage resources.

Figure 11:
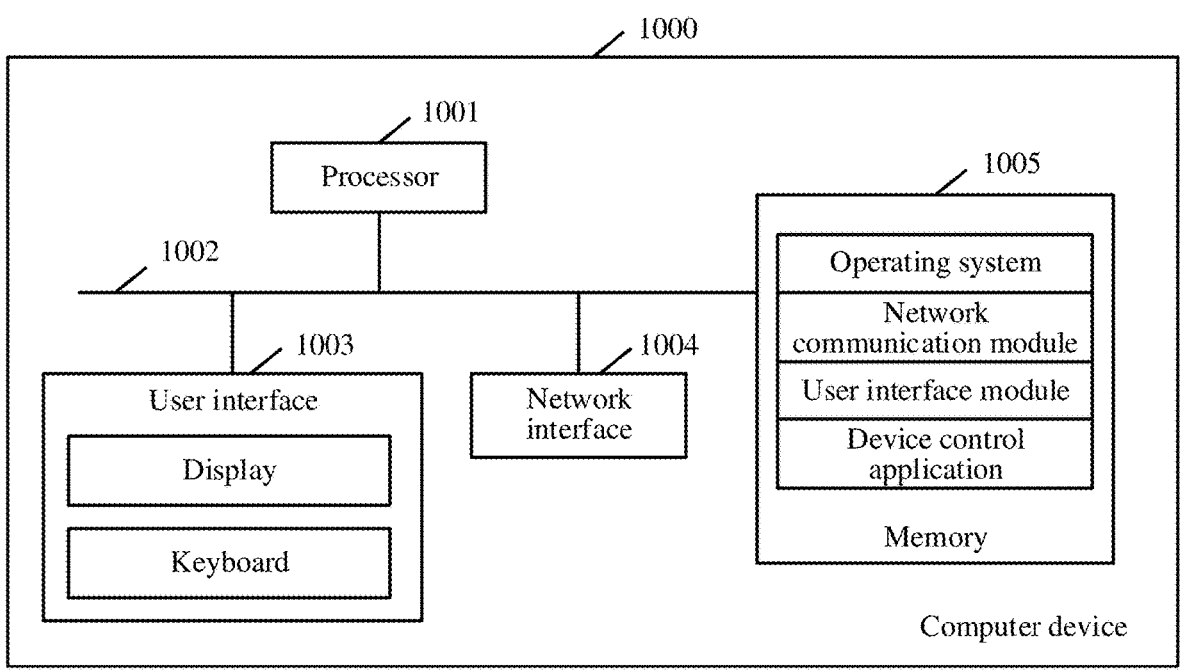
FIG. 11 is a schematic structural diagram of a computer device according to an embodiment of this application.

FIG. 11 is a schematic structural diagram of a computer device according to an embodiment of this application. As shown in FIG. 11, the computer device 1000 may be the first node 10 in the embodiment corresponding to FIG. 3. The computer device 1000 may include: a processor 1001, a network interface 1004, and a memory 1005. In addition, the computer device 1000 may further include a user interface 1003 and at least one communication bus 1002. The communication bus 1002 is configured to implement connection and communication between these components. The user interface 1003 may include a display and a keyboard. In some embodiments, the user interface 1003 may further include a standard wired interface and a standard wireless interface. In some embodiments, the network interface 1004 may include a standard wired interface and a standard wireless interface (for example, a Wi-Fi interface). The memory 1005 may be a high-speed random access memory (RAM), or may be a non-volatile memory, for example, at least one magnetic disk storage. In some embodiments, the memory 1005 may alternatively be at least one storage apparatus located remotely from the processor 1001. As shown in FIG. 11, the memory 1005 used as a non-transitory computer-readable storage medium may include an operating system, a network communication module, a user interface module, and a device control application.

In the computer device 1000 shown in FIG. 11, the network interface 1004 may provide a network communication function, the user interface 1003 is mainly configured to provide an input interface for a user, and the processor 1001 may be configured to invoke the device control application stored in the memory 1005, to implement: obtaining target transaction data from a transaction pool, and generating a to-be-checked hash value of the target transaction data; obtaining a block list of historical blocks that have been uploaded to a blockchain, and determining an upload status of the target transaction data according to the block list and the to-be-checked hash value; deleting the target transaction data when the upload status of the target transaction data is an uploaded state; and generating a target block according to the target transaction data and performing uploading processing on the target block, when the upload status of the target transaction data is an un-uploaded state.

Figure 12:
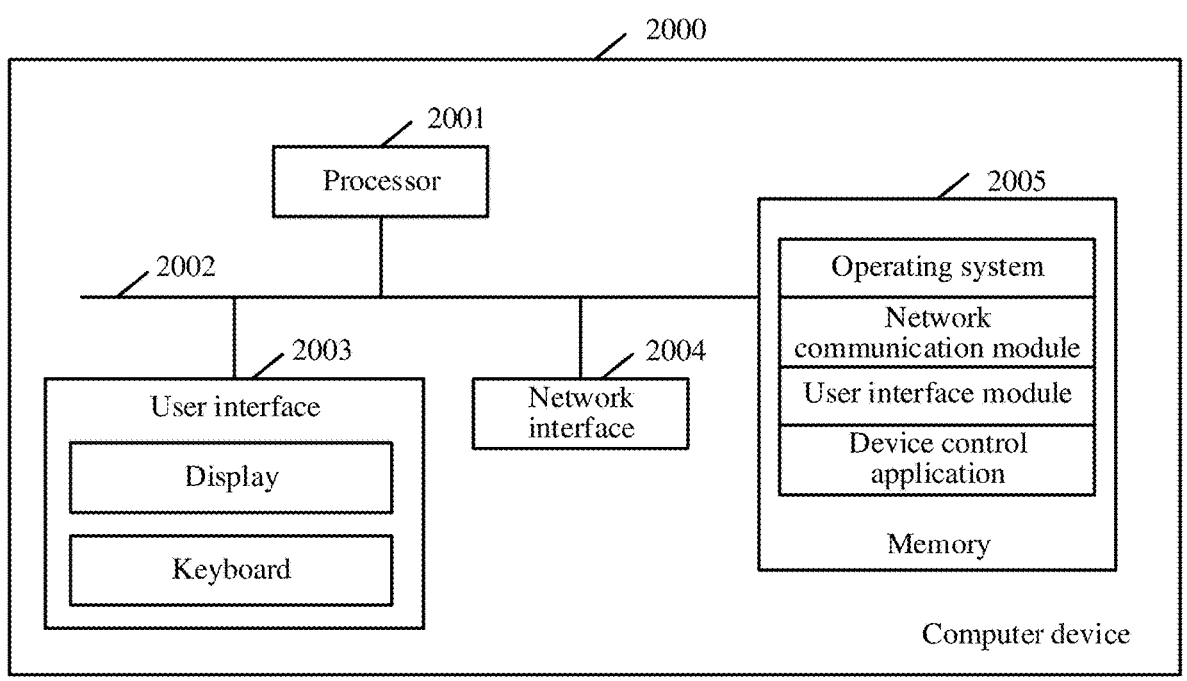
FIG. 12 is a schematic structural diagram of a computer device according to an embodiment of this application.

FIG. 12 is a schematic structural diagram of a computer device according to an embodiment of this application. As shown in FIG. 12, the computer device 2000 may be the consensus node in the embodiment corresponding to FIG. 8. The computer device 2000 may include: a processor 2001, a network interface 2004, and a memory 2005. In addition, the computer device 2000 may further include a user interface 2003 and at least one communication bus 2002. The communication bus 2002 is configured to implement connection and communication between these components. The user interface 2003 may include a display and a keyboard. In some embodiments, the user interface 2003 may further include a standard wired interface and a standard wireless interface. In some embodiments, the network interface 2004 may include a standard wired interface and a standard wireless interface (for example, a Wi-Fi interface). The memory 2005 may be a high-speed random access memory (RAM), or may be a non-volatile memory, for example, at least one magnetic disk storage. In some embodiments, the memory 2005 may alternatively be at least one storage apparatus located remotely from the processor 2001. As shown in FIG. 12, the memory 2005 used as a non-transitory computer-readable storage medium may include an operating system, a network communication module, a user interface module, and a device control application.

In the computer device 2000 shown in FIG. 12, the network interface 2004 may provide a network communication function, the user interface 2003 is mainly configured to provide an input interface for a user, and the processor 2001 may be configured to invoke the device control application stored in the memory 2005, to implement: obtaining a target block transmitted by a block generation node and a to-be-checked hash value of target transaction data in the target block; obtaining a block list of historical blocks that have been uploaded to a blockchain, and determining an upload status of the target transaction data according to the block list and the to-be-checked hash value; determining that the target block fails consensus verification, when the upload status of the target transaction data is an uploaded state; and performing consensus processing on the target block, when the upload status of the target transaction data is an un-uploaded state.

The embodiments of this application further provide a computer program product or a computer program. The computer program product or the computer program includes program instructions, the program instructions being stored in a non-transitory computer-readable storage medium. A processor of a computer device reads the program instructions from the non-transitory computer-readable storage medium, and executes the program instructions, to cause the computer device to perform the blockchain-based data processing method in the embodiments of this application, e.g., the blockchain-based data processing methods provided by the steps in FIG. 3 and FIG. 8. Reference may be made to the implementations provided in the steps in FIG. 3 and FIG. 8.

An embodiment of this application further provides a non-transitory computer-readable storage medium, the non-transitory computer-readable storage medium storing a computer program, and the computer program including program instructions. The program instructions, when executed by a processor, implement the blockchain-based data processing method provided in the embodiments of this application, e.g., the blockchain-based data processing methods provided by the steps in FIG. 3 and FIG. 8. Reference may be made to the implementations provided in the steps in FIG. 3 and FIG. 8.

The non-transitory computer-readable storage medium may be the blockchain-based data processing apparatus provided in any one of the foregoing embodiments or an internal storage unit of a computer device, for example, a hard disk or an internal memory of the computer device. The non-transitory computer-readable storage medium may alternatively be an external storage device of the computer device, for example, a removable hard disk, a smart media card (SMC), a secure digital (SD) card, or a flash card equipped on the computer. In some embodiments, the non-transitory computer-readable storage medium may include both an internal storage unit and an external storage device of the computer device. The non-transitory computer-readable storage medium is configured to store the computer program and other program and data that are required by the computer device. The non-transitory computer-readable storage medium may further be configured to temporarily store data that has been output or data to be output.

In the specification, claims, and accompanying drawings of the embodiments of this application, the terms "first", "second" or the like are intended to distinguish between different objects but do not indicate a particular order. In addition, the terms "include" and any variant thereof are intended to cover a non-exclusive inclusion. For example, a process, method, apparatus, product, or device that includes a series of operations or modules is not limited to the listed operations or modules; and instead, further optionally includes an operation or module that is not listed, or further optionally includes another operation or module that is intrinsic to the process, method, apparatus, product, or device.

A person of ordinary skill in the art may be aware that the units and operations in the examples described with reference to the embodiments disclosed herein may be implemented by electronic hardware, computer software, or a combination thereof. To clearly describe the interchangeability between the hardware and the software, the foregoing has generally described compositions and operations of each example according to functions. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

The methods and related apparatuses provided in the embodiments of this application are described with reference to the method flowcharts and/or schematic structural diagrams provided in the embodiments of this application. Specifically, each process and/or block of the method flowcharts and/or schematic structural diagrams, and combination of processes and/or blocks in the flowcharts and/or block diagrams, may be implemented by program instructions. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the schematic structural diagrams. These computer program instructions may also be stored in a non-transitory computer-readable memory that can guide a computer or another programmable data processing device to work in a specified manner, so that the instructions stored in the non-transitory computer-readable memory generate a product including an instruction apparatus, where the instruction apparatus implements functions specified in one or more procedures in the flowcharts and/or one or more blocks in the schematic structural diagrams. The computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

The foregoing disclosure is merely example embodiments of this application, and certainly is not intended to limit the protection scope of this application. Therefore, equivalent variations made in accordance with the claims of this application fall within the scope of this application.

What is claimed is:

1. A computer implemented method implemented using at least one hardware processor, the method comprising:
   obtaining, by a first node of a blockchain, target transaction data from a transaction pool;
   generating, by the first node of the blockchain, a to-be-checked hash value of the target transaction data;
   obtaining, by the first node of the blockchain, a block list, the block list comprising a list of historical blocks that have been stored by the first node of the blockchain and corresponding historical hash values of transaction data in the historical blocks; and
   determining, by the first node of the blockchain, whether there is a match between any of the historical hash values and the to-be-checked hash value; wherein:
   based on a determination that there is a match between one of the historical hash values of the block list and the to-be-checked hash value, deleting the target transaction data from the transaction pool when the upload status of the target transaction data is in an uploaded state;
   based on a determination that there is not a match between any of the historical hash values of the block list and the to-be-checked hash value:
   generating a target block according to the target transaction data; and broadcasting, by the first node and to one or more additional nodes of the blockchain, the target block; and wherein based on the determination that there is a match between one of the historical hash values of the block list and the to-be-checked hash value, determine whether a second target block associated with the to-be-checked hash value fails consensus verification.

2. The computer implemented method according to claim 1, further comprising:
   based on a determination that there is no match between any of the historical hash values of the block list and the to-be-checked hash value, determine whether the target block fails consensus verification.

3. The computer implemented method according to claim 1, wherein after the obtaining the target transaction data, the method further comprises:
   adding the target transaction data to a to-be-stored transaction sequence that is used for generating the target block, wherein the deleting further comprises: deleting the target transaction data from the to-be-stored transaction sequence.

4. The computer implemented method according to claim 1, wherein the generating the target block further comprises:
   adding the target transaction data to a to-be-stored transaction sequence; and
   generating the target block according to the to-be-stored transaction sequence.

5. The computer implemented method according to claim 4, wherein the generating the target block according to the to-be-stored transaction sequence further comprises:
   determining a quantity of transaction data in the to-be-stored transaction sequence as a transaction data quantity;
   using a quantity difference between a sequence quantity threshold and the transaction data quantity as a supplementary quantity, when the transaction data quantity is less than a sequence quantity threshold;

obtaining supplementary transaction data from the transaction pool, wherein a quantity of the supplementary transaction data is equal to the supplementary quantity; and generating the target block according to the supplementary transaction data and the to-be-stored transaction sequence.

6. The computer implemented method according to claim 5, wherein the generating the target block according to the supplementary transaction data and the to-be-stored transaction sequence further comprises:

generating the target block according to the supplementary transaction data and the to-be-stored transaction sequence.

7. The computer implemented method according to claim 1, wherein the method further comprises:

determining target block information of the target block when storing of the target block is complete, wherein the target block information comprises a hash value of transaction data in the target block;

updating the block list according to the target block information; and deleting the transaction data in the target block from the transaction pool.

8. The computer implemented method according to claim 7, wherein the updating the block list further comprises:

determining a quantity of historical block information in the block list as a block information quantity; and adding, when the block information quantity is less than a list quantity threshold, the target block information to the block list.

9. The computer implemented method according to claim 1, wherein the method further comprises:

determining, when a first system time reaches a first heartbeat update cycle, a node quantity for nodes in a blockchain network;

updating a list quantity threshold of the block list according to the node quantity; and obtaining an updated list quantity threshold based on the updated list quantity threshold, wherein the node quantity and the updated list quantity threshold have a proportional relationship.

10. The computer implemented method according to claim 9, wherein the method further comprises:

determining, when a second system time reaches a second heartbeat update cycle, at least two historical hash values in the block list;

generating a to-be-filtered hash value of transaction data in the transaction pool;

matching the historical hash values against the to-be-filtered hash value; and performing filtering processing on the transaction data in the transaction pool according to the matching.

11. The computer implemented method according to claim 10, wherein the performing filtering processing further comprises:

determining, when there is a match between one of the historical hash values and the to-be-filtered hash value, the transaction data corresponding to the to-be-filtered hash value as duplicate transaction data; and deleting the duplicate transaction data from the transaction pool.

12. The computer implemented method according to claim 1, wherein the determining whether there is a match comprises:

determining a quantity of the target transaction data obtained from the transaction pool as a transaction data quantity; and determining, when the transaction data quantity reaches a quantity threshold, whether there is a match between any of the historical hash values and the to-be-checked hash value.

13. The computer implemented method according to claim 1, wherein the obtaining the target transaction data from the transaction pool further comprises:

obtaining one target transaction data from the transaction pool at a time;

obtaining a quantity of target transaction data from the transaction pool according to a sequence quantity threshold of a to-be-stored transaction sequence at a time, wherein the quantity of target transaction data is equal to the sequence quantity threshold, and the to-be-stored transaction sequence is used for generating the target block; or obtaining at least two target transaction data from the transaction pool at a time, wherein a quantity of the at least two target transaction data is less than the sequence quantity threshold.

14. A non-transitory computer-readable storage medium, storing instructions that, when executed by a processor, causing the processor to:

obtain, by a first node of a blockchain, target transaction data from a transaction pool;

generate, by the first node of the blockchain, a to-be-checked hash value of the target transaction data;

obtain, by the first node of the blockchain, a block list, the block list comprising a list of historical blocks that have been stored by the first node of the blockchain and corresponding historical hash values of transaction data in the historical blocks; and determine, by the first node of the blockchain, whether there is a match between any of the historical hash values and the to-be-checked hash value, wherein:

based on a determination that there is a match between one of the historical hash values of the block list and the to-be-checked hash value, delete the target transaction data from the transaction pool;

based on a determination that there is not a match between any of the historical hash values of the block list and the to-be-checked hash value:

generate a target block according to the target transaction data; and broadcast, by the first node and to one or more additional nodes of the blockchain, the target block; and based on the determination that there is a match between one of the historical hash values of the block list and the to-be-checked hash value, determine whether a second target block associated with the to-be-checked hash value fails consensus verification.

15. A blockchain-based data processing apparatus, comprising:

one or more processors; and memory storing computer-readable instructions that when executed by the one or more processors, cause the blockchain-based data processing apparatus configure to:

obtain, by a first node of a blockchain, target transaction data from a transaction pool;

generate, by the first node of the blockchain, a to-be-checked hash value of the target transaction data;

obtain, by the first node of the blockchain, a block list, the block list comprising a list of historical blocks that have been stored by the first node of the-a blockchain and corresponding historical hash values of transaction data in the historical blocks; and determine, by the first node of the blockchain, whether there is a match between any of the historical hash values and the to-be-checked hash value; wherein:

based on a determination that there is a match between one of the historical hash values of the block list and the to-be-checked hash value, delete the target transaction data from the transaction pool;

based on a determination that there is not a match between any of the historical hash values of the block list and the to-be-checked hash value: generate a target block according to the target transaction data; and broadcast, by the first node and to one or more additional nodes of the blockchain; and wherein based on the determination that there is a match between one of the historical hash values of the block list and the to-be-checked hash value, determine whether a second target block associated with the to-be-checked hash value fails consensus verification.

16. The non-transitory computer readable storage medium according to claim 14, further storing instructions that, when executed by the processor, cause the processor to:

based on a determination that there is no match between any of the historical hash values of the block list and the to-be-checked hash value, determine whether the target block fails consensus verification.

17. The blockchain-based data processing according to claim 15, the memory further storing instructions that, when executed by the one or more processors, cause the blockchain-based data processing apparatus to:

based on a determination that there is no match between any of the historical hash values of the block list and the to-be-checked hash value, whether the target block fails consensus verification.

* * * * *